United States Patent
Kanakasabai et al.

(10) Patent No.: US 11,316,381 B2
(45) Date of Patent: Apr. 26, 2022

(54) RECEIVER UNIT OF A WIRELESS POWER TRANSFER SYSTEM

(71) Applicant: General Electric Company, Schenectady, NY (US)

(72) Inventors: Viswanathan Kanakasabai, Bangalore (IN); Deepak Aravind, Bangalore (IN); Suma Memana Narayana Bhat, Bangalore (IN); Adnan Kutubuddin Bohori, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/048,429

(22) PCT Filed: Mar. 22, 2019

(86) PCT No.: PCT/US2019/023548
§ 371 (c)(1),
(2) Date: Oct. 16, 2020

(87) PCT Pub. No.: WO2019/203990
PCT Pub. Date: Oct. 24, 2019

(65) Prior Publication Data
US 2021/0152027 A1 May 20, 2021

(30) Foreign Application Priority Data

Apr. 19, 2018 (IN) .............................. 201841014948
Sep. 7, 2018 (IN) .............................. 201843033690

(51) Int. Cl.
*H02J 50/40* (2016.01)
*H02J 50/80* (2016.01)
(Continued)

(52) U.S. Cl.
CPC ............ *H02J 50/402* (2020.01); *H02J 50/12* (2016.02); *H02J 50/80* (2016.02); *H02J 50/90* (2016.02)

(58) Field of Classification Search
CPC .......... H02J 50/402; H02J 50/80; H02J 50/90; H02J 50/12
(Continued)

(56) References Cited

U.S. PATENT DOCUMENTS 9,490,656 B2 * 11/2016 Kurz ......................... H01F 5/00
10,581,282 B2 * 3/2020 Lovas ...................... H02J 50/80
(Continued)

FOREIGN PATENT DOCUMENTS

WO 2019203990 10/2019

OTHER PUBLICATIONS

"PCT Application No. PCT/US2019/023548 International Search Report", dated Jul. 5, 2019, 13 pages.
"India Application No. 201841014948 Examination Report", dated Jan. 25, 2021, 5 pages.
"India Application No. 201843033690 First Examination Report", dated Sep. 7, 2021, 5 pages.

*Primary Examiner* — Alfonso Perez Borroto
(74) *Attorney, Agent, or Firm* — Delizio, Peacock, Lewin & Guerra, PLLC

(57) ABSTRACT

A receiver unit of a wireless power transfer system is presented. The receiver unit includes a main receiver coil, a plurality of auxiliary receiver coils disposed about a central axis of the main receiver coil, and a receiver drive subunit. The receiver drive subunit includes a main converter operatively coupled to the main receiver coil and having a main output terminal. The receiver drive subunit may include a plurality of auxiliary converters operatively coupled to the plurality of auxiliary receiver coils. The plurality of auxiliary converters may be operatively coupled to each other to form an auxiliary output terminal coupled in series to the main output terminal to form a common output terminal. In (Continued)

some implementations, the receiver drive unit may be formed on a substrate of an integrated electronic component. The integrated electronic component may further include a communication subunit and a controller disposed.

34 Claims, 11 Drawing Sheets

(51) Int. Cl.
*H02J 50/90* (2016.01)
*H02J 50/12* (2016.01)

(58) Field of Classification Search
USPC .......................................................... 307/104
See application file for complete search history.

(56) References Cited

U.S. PATENT DOCUMENTS

| | | | |
|---|---|---|---|
| 2013/0307468 A1* | 11/2013 | Lee | H02J 50/90 |
| | | | 320/108 |
| 2014/0015329 A1* | 1/2014 | Widmer | B60L 53/68 |
| | | | 307/104 |
| 2014/0217965 A1 | 8/2014 | Van Wiemeersch et al. | |
| 2015/0333530 A1* | 11/2015 | Moyer | H02J 5/00 |
| | | | 307/104 |
| 2016/0285280 A1 | 9/2016 | Kallal et al. | |
| 2017/0170688 A1* | 6/2017 | Maniktala | H02J 50/12 |
| 2017/0222479 A1 | 8/2017 | Jha et al. | |
| 2018/0233954 A1* | 8/2018 | Yang | H04B 5/0087 |

* cited by examiner

RECEIVER UNIT OF A WIRELESS POWER TRANSFER SYSTEM

CROSS-REFERENCE TO RELATED APPLICATIONS

This Patent Application claims priority to India Patent Application Number 201841014948, filed Apr. 19, 2018, entitled "A RECEIVER UNIT OF A WIRELESS POWER TRANSFER SYSTEM AND AN ASSOCIATED METHOD THEREOF" and to India Patent Application Number 201843033690, filed Sep. 7, 2018, entitled "INTEGRATED ELECTRONIC COMPONENT OF A RECEIVER UNIT OF A WIRELESS POWER TRANSFER SYSTEM", the contents of which are hereby incorporated by reference.

TECHNICAL FIELD

Certain aspects of the present disclosure generally relate to a power transfer system and more particularly to a wireless power transfer system. In one aspect, the present disclosure relates to a receiver unit of a wireless power transfer system.

DESCRIPTION OF THE RELATED TECHNOLOGY

A wireless power transfer system includes a transmitter coil, a receiver coil, and corresponding electronic circuitry. Typically, efficiency of power transfer between the transmitter coil and the receiver coil is compromised due to misalignment between the transmitter coil and the receiver coil.

Different techniques have been proposed for overcoming the shortcomings in power transfer due to misalignment between the transmitter coil and the receiver coil. Some of these techniques use controllable switches, adaptive controllers, position sensors, and optical cameras, which can result in a complex power transfer system with associated power losses. Furthermore, the packaging of the electronic circuitry remains a challenge.

Thus, there is a need for an enhanced receiver unit of the wireless power transfer system and an associated method.

SUMMARY

Various implementations of systems, methods and devices within the scope of the appended claims each have several aspects, no single one of which can be solely responsible for the desirable attributes described herein. Without limiting the scope of the appended claims, some prominent features can be described herein.

In accordance with one aspect of the present specification, a receiver unit of a wireless power transfer system is presented. The receiver unit includes a main receiver coil, a plurality of auxiliary receiver coils disposed about a central axis of the main receiver coil, and a receiver drive subunit. The receiver drive subunit includes a main converter operatively coupled to the main receiver coil, where the main converter includes a main output terminal. Further, the receiver drive subunit includes a plurality of auxiliary converters operatively coupled to the plurality of auxiliary receiver coils, where the plurality of auxiliary converters is operatively coupled to each other to form an auxiliary output terminal, and where the auxiliary output terminal is coupled in series to the main output terminal.

In accordance with another aspect of the present specification, a wireless power transfer system is presented. The wireless power transfer system includes a transmitter unit, and a receiver unit operatively coupled to the transmitter unit. The receiver unit includes a main receiver coil, a plurality of auxiliary receiver coils disposed about a central axis of the main receiver coil, and a receiver drive subunit. The receiver drive subunit includes main converter operatively coupled to the main receiver coil, where the main converter includes a main output terminal; and a plurality of auxiliary converters operatively coupled to the plurality of auxiliary receiver coils, where the plurality of auxiliary converters is operatively coupled to each other to form an auxiliary output terminal, and where the auxiliary output terminal is coupled in series to the main output terminal.

In accordance with another aspect of the present specification, a method of operation of a receiver unit of a wireless power transfer system. The method includes inducing a first voltage at at least one of a main receiver coil and a plurality of auxiliary receiver coils based on an alignment of the main receiver coil and the plurality of auxiliary receiver coils with a transmitter coil. Further, the method includes generating a second voltage at a main output terminal of a main converter and a third voltage at an auxiliary output terminal of a plurality of auxiliary converters based on the first voltage. Furthermore, the method includes transmitting a combination of the second voltage and the third voltage to a load.

In accordance with another aspect of the present specification, a receiver unit of a wireless power transfer system is presented. The receiver unit includes a main receiver coil, a plurality of auxiliary receiver coils disposed about a central axis of the main receiver coil, and an integrated electronic component. The integrated electronic component includes a substrate, a receiver drive subunit formed on the substrate, where the receiver drive subunit includes a main converter operatively coupled to the main receiver coil, where the main converter includes a main output terminal and a plurality of auxiliary converters operatively coupled to the plurality of auxiliary receiver coils, where the plurality of auxiliary converters is operatively coupled to each other to form an auxiliary output terminal coupled in series to the main output terminal to form a common output terminal. Further, the integrated electronic component includes a communication subunit formed on the substrate and operatively coupled to the receiver drive subunit and a controller disposed on the substrate and operatively coupled to at least one of the common output terminal, an alternating current terminal of the main converter, alternating current terminals of the plurality of auxiliary converters, and the communication subunit, where the controller is configured to determine one or more circuit parameters corresponding to at least one of the common output terminal, the alternating current terminal of the main converter, and the alternating current terminals of the plurality of auxiliary converters and control at least the communication subunit based on the one or more circuit parameters.

In accordance with another aspect of the present specification, a wireless power transfer system is presented. The wireless power transfer system includes a transmitter unit, a receiver unit operatively coupled to the transmitter unit, where the receiver unit includes a main receiver coil, a plurality of auxiliary receiver coils disposed about a central axis of the main receiver coil, and an integrated electronic component. The integrated electronic component includes a substrate and a receiver drive subunit formed on the substrate. The receiver drive subunit includes a main converter operatively coupled to the main receiver coil, where the main converter includes a main output terminal; and a plurality of auxiliary converters operatively coupled to the plurality of auxiliary receiver coils, where the plurality of auxiliary converters is operatively coupled to each other to form an auxiliary output terminal coupled in series to the main output terminal to form a common output terminal. The integrated electronic component further includes a communication subunit disposed on the substrate and operatively coupled to the receiver drive subunit and a controller disposed on the substrate and operatively coupled to at least one of the common output terminal, an alternating current terminal of the main converter, alternating current terminals of the plurality of auxiliary converters, and the communication subunit, where the controller is configured to determine one or more circuit parameters corresponding to at least one of the common output terminal, the alternating current terminal of the main converter, and the alternating current terminals of the plurality of auxiliary converters and control at least the communication subunit based on the one or more circuit parameters.

In accordance with another aspect of the present specification, a method of operation of a wireless power transfer system is presented. The method includes determining, by a controller, one or more circuit parameters corresponding to at least one of a common output terminal, an alternating current terminal of a main converter, and alternating current terminals of a plurality of auxiliary converters, where the common output terminal is formed by connecting an auxiliary output terminal to a main output terminal of the main converter in series, where the auxiliary output terminal is formed by operatively coupling the plurality of auxiliary converters of a receiver drive subunit to each other. Further, the method includes controlling operation of a communication subunit based on the one or more circuit parameters, where the communication subunit is operatively coupled to the receiver drive subunit. Furthermore, the method includes inducing a first voltage, by a transmitter coil of a transmitter unit, at at least one of a main receiver coil and a plurality of auxiliary receiver coils based on an alignment of the main receiver coil and the plurality of auxiliary receiver coils with the transmitter coil, where the plurality of auxiliary converters is operatively coupled to the plurality of auxiliary receiver coils and the main converter is operatively coupled to the main receiver coil. Additionally, the method includes generating a second voltage at the common output terminal.

In accordance with another aspect of the present specification, an integrated electronic component for a receiver unit of a wireless power transfer system is presented. The integrated electronic component includes a substrate, a receiver drive subunit formed on the substrate, where the receiver drive subunit includes a main converter configured to be operatively coupled to a main receiver coil, where the main converter includes a main output terminal; and a plurality of auxiliary converters configured to be operatively coupled to a plurality of auxiliary receiver coils, where the plurality of auxiliary converters is operatively coupled to each other to form an auxiliary output terminal coupled in series to the main output terminal to form a common output terminal. Further, the integrated electronic component includes a communication subunit formed on the substrate and operatively coupled to the receiver drive subunit. Furthermore, the integrated electronic component includes a controller disposed on the substrate and operatively coupled to at least one of the receiver drive subunit and the communication subunit, where the controller is configured to determine one or more circuit parameters corresponding to the receiver drive sub-unit and control at least the communication subunit based on the one or more circuit parameters.

BRIEF DESCRIPTION OF THE DRAWINGS

These and other features, aspects, and advantages of the present disclosure will become better understood when the following detailed description is read with reference to the accompanying drawings in which like reference numbers and designations represent like elements throughout the drawings. Other features, aspects, and advantages will become apparent from the description, the drawings, and the claims. Note that the relative dimensions of the following figures may not be drawn to scale.

DETAILED DESCRIPTION

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving wireless power.

As will be described in detail hereinafter, various embodiments of a wireless power transfer (WPT) system are disclosed. In particular, the systems and methods disclose employing an receiver unit having a plurality of auxiliary receiver coils disposed about a central axis of a main receiver coil. Further, the various embodiments disclose different arrangements of the auxiliary receiver coils with respect to the main receiver coil. Furthermore, the embodiments disclose the arrangement of the auxiliary receiver coils with respect to associated auxiliary converters. The receiver unit may be employed in wireless charging systems, such as but not limited to a mobile phone, a laptop, an electric vehicle, consumer electronic products, and the like. In some implementations, the systems and methods disclose the arrangement of the receiver coils with respect to associated converters. Additionally, different embodiments of the integrated electronic component of the receiver unit is disclosed.

Particular implementations of the subject matter described in this disclosure can be implemented to realize one or more of the following potential advantages. In some implementations, the arrangement of the main receiver coil and the plurality of auxiliary receiver coils may aid in enhancing communication with the transmitter coil and allows efficient power transfer between the transmitter coil and the receiver coils even in the event of misalignment of the main receiver coil with the transmitter coil. In some implementations, the arrangement of the auxiliary converters may aid in activation and deactivation of the diodes of the auxiliary converters without use of controllers. Furthermore, the wireless power transfer system may adjust misalignments between the transmitter unit and the receiver unit without employing sensors or any other detection techniques, such as camera. In some implementations, the main converter, the auxiliary converters, and other related electronics of the receiver unit may be formed on a substrate to form an integrated electronic component. Accordingly, the footprint of the corresponding electronics of the receiver unit may be considerably reduced.

Figure 1A:
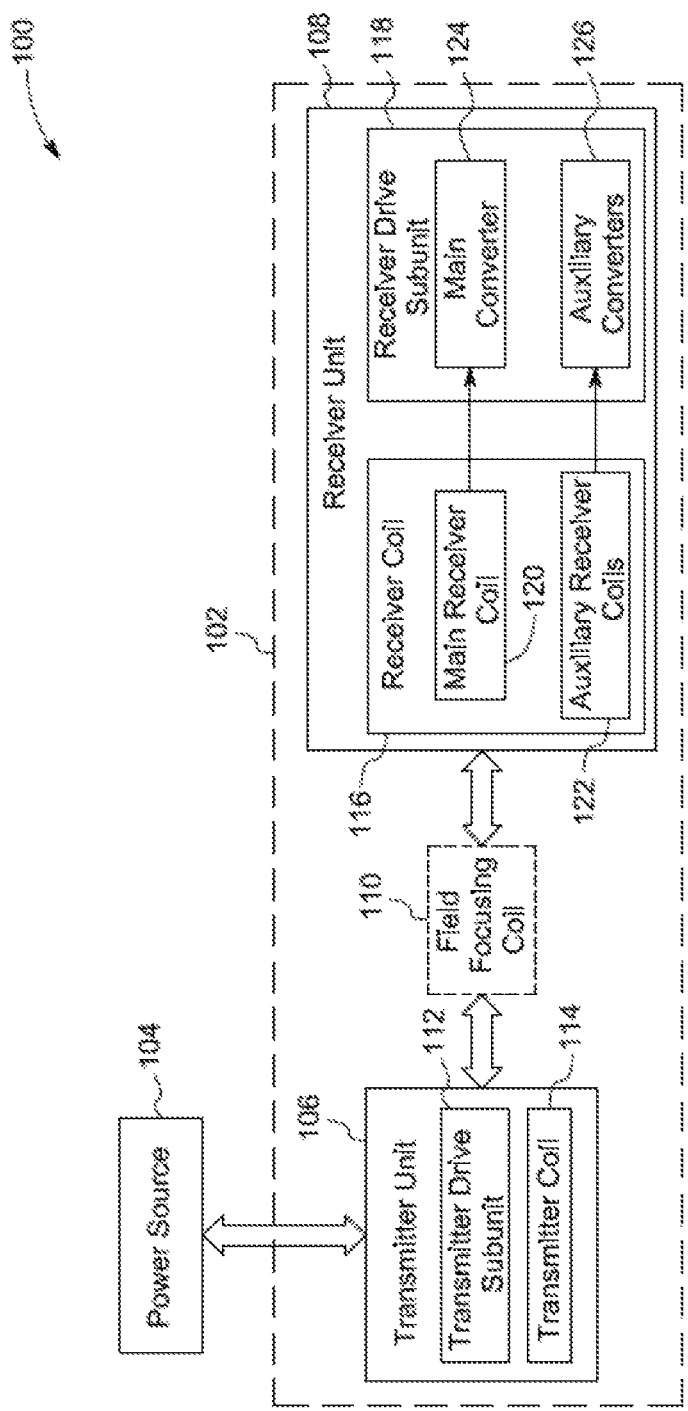
FIG. 1A is a block diagram of an example wireless power transfer system.

FIG. 1A is a block diagram of an example wireless power transfer system 100. The wireless power transfer system 100 includes a wireless power transfer unit 102 and a power source 104. In the illustrated embodiment, the wireless power transfer unit 102 includes a transmitter unit 106, a receiver unit 108, and a field focusing coil 110. The transmitter unit 106 is magnetically coupled to the receiver unit 108 via the field focusing coil 110. The field focusing coil 110 is used to focus a magnetic field from the transmitter unit 106 to the receiver unit 108. In another embodiment, the field focusing coil 110 may not be present in the wireless power transfer unit 102.

The transmitter unit 106 includes a transmitter (Tx) drive subunit 112 coupled to a transmitter (Tx) coil 114. In one embodiment, the transmitter drive subunit 112 may be a converter. The transmitter drive subunit 112 includes semiconductor switches, such as an insulated gate bipolar transistor, a metal oxide semiconductor field effect transistor, a field-effect transistor, an injection enhanced gate transistor, an integrated gate commutated thyristor, a gallium nitride based switch, a silicon carbide based switch, a gallium arsenide based switch, diodes, or the like. In one embodiment, the transmitter coil 114 may be a wound copper wire.

The receiver unit 108 includes a receiver (Rx) coil 116 and a receiver (Rx) drive subunit 118. In accordance with aspects of the present specification, the receiver coil 116 includes a main receiver coil 120 and a plurality of auxiliary receiver coils 122. The plurality of auxiliary receiver coils 122 is disposed about the central axis of the main receiver coil 120. The plurality of auxiliary receiver coils 122 may also be interchangeably referred to herein as an array of auxiliary receiver coils. In some implementations, each of the main receiver coil 120 and the plurality of auxiliary receiver coils 122 may include a wound copper wire.

In some implementations, the example receiver unit 108 may form a part of a two-coil wireless power transfer system, three-coil wireless power transfer system, and a four-coil wireless power transfer system. As will be appreciated, the two-coil wireless power transfer system includes the receiver unit and the transmitter unit. Further, the three-coil power transfer system includes a field focusing coil in addition to the receiver unit and the transmitter unit. The four-coil power transfer system includes a phase compensation coil in addition to the receiver unit, the field focusing coil, and the transmitter unit.

In one embodiment, the main receiver coil 120 and the plurality of auxiliary receiver coils 122 are resonant coils. In particular, each of the main receiver coil 120 and the plurality of auxiliary receiver coils 122 may be coupled to a corresponding capacitor (not shown). In some implementations, the main receiver coil 120 and the plurality of auxiliary receiver coils 122 are compatible with a Wireless Power Consortium™ (WPC) standard (Qi™) that is defined in a frequency range of 100 kHz to 200 kHz.

Further, the receiver drive subunit 118 includes a main converter 124 and a plurality of auxiliary converters 126. The main receiver coil 120 is coupled to the main converter 124. The main converter 124 includes a main output terminal and is configured to rectify a voltage induced at the main receiver coil 120 during operation. Each of the main converter 124 and the plurality of auxiliary converters 126 include a plurality of first switches (not shown). The plurality of first switches includes semiconductor switches, such as an insulated gate bipolar transistor, a metal oxide semiconductor field effect transistor, a field-effect transistor, an injection enhanced gate transistor, an integrated gate commutated thyristor, a gallium nitride based switch, a silicon carbide based switch, a gallium arsenide based switch, diodes, or the like.

The main receiver coil 120 is coupled to the main converter 124. The main converter 124 includes a main output terminal (not shown) and is configured to rectify a voltage induced at the main receiver coil 120. Further, the auxiliary receiver coils 122 are coupled to the auxiliary converters 126. The auxiliary converters 126 are configured to rectify voltages induced at the auxiliary receiver coils 122. In one embodiment, each auxiliary receiver coil 122 is coupled to a corresponding auxiliary converter 126. In one embodiment, at least one of the main converter 124 and the plurality of auxiliary converters 126 is a passive rectifier. In one specific embodiment, the passive rectifier is a diode rectifier. In another embodiment, at least one of the main converter 124 and the plurality of auxiliary converters 126 includes a hybrid rectifier and an active rectifier.

Furthermore, the plurality of auxiliary converters 126 is coupled to each other to form an auxiliary output terminal (not shown). In accordance with aspects of the present specification, the main output terminal of the main converter 124 is coupled to the auxiliary output terminal in series to form a common output terminal (not shown). Further, a load (not shown) may be coupled across the main output terminal and the auxiliary output terminal. For example, the load may be coupled to the common output terminal.

It may be noted that conventional wireless power transfer systems may typically include a single receiver coil. This receiver coil contributes towards supply of a voltage to a load, such as a battery. In one scenario, if the receiver coil is not aligned with a transmitter coil, in order to induce a desired voltage in the receiver coil, the current in the transmitter coil has to be higher than the current in the transmitter coil, when the receiver coil is aligned with the transmitter coil. As a result, efficiency of the conventional wireless power transfer system is compromised. Shortcomings of the conventional wireless power transfer systems can be overcome using the example wireless power transfer system 100.

As noted hereinabove, the example receiver unit 108 includes the auxiliary receiver coils 122 in addition to the main receiver coil 120. The combination of the main receiver coil 120 and the auxiliary receiver coils 122 is configured to provide a desired voltage to the load, via the main and auxiliary converters 124, 126, even in an event of misalignment of the main receiver coil 120 with respect to the transmitter coil 114.

It may be noted herein that if a central axis of the transmitter coil 114 is aligned with a central axis of the main receiver coil 120, the main receiver coil 120 is aligned with the transmitter coil 114. The central axis of the transmitter coil 114 is an axis passing through a center of the transmitter coil 114. Similarly, the central axis of the main receiver coil 120 is an axis passing through a center of the main receiver coil 120.

In one embodiment, when the receiver coil 116 is in alignment with the transmitter coil 114, the transmitter unit 106 provides power to the load. In particular, during operation of the wireless power transfer system 100, power provided from the power source 104 is converted from one form to another form by the transmitter drive subunit 112 and provided to the transmitter coil 114. More particularly, the low frequency or direct current (DC) power fed from the power source 104 is converted to a high frequency power by the transmitter drive subunit 112. Accordingly, the transmitter coil 114 is energized and a magnetic field is generated at the transmitter coil 114. The magnetic field at the transmitter coil 114 induces voltages at the main receiver coil 120 and the plurality of auxiliary receiver coils 122 based on alignment of the main receiver coil 120 and the plurality of auxiliary receiver coils 122 with respect to the transmitter coil 114.

The combination of voltages induced at the main receiver coil 120 and the plurality of auxiliary receiver coils 122 may be referred to as a first voltage. The voltages induced at the main receiver coil 120 and the plurality of auxiliary receiver coils 122 are transmitted to the main converter 124 and the plurality of auxiliary converters 126, respectively. A rectified voltage is generated at the main output terminal of the main converter 124 and another rectified voltage is generated at the auxiliary output terminal of the plurality of auxiliary converters 126. In accordance with aspects of the present specification, a combination of the voltage obtained at the main output terminal and the voltage obtained at the auxiliary output terminal is provided to the load (not shown). The combination of the voltages obtained at the main output terminal and the voltage obtained at the auxiliary output terminal may be referred to as a second voltage.

It should be noted herein that if a central axis of the transmitter coil 114 is aligned with a central axis of the main receiver coil 120, the main receiver coil 120 is aligned with the transmitter coil 114. When the main receiver coil 120 is aligned with the transmitter coil 114, the main receiver coil 120 has a maximum magnetic coupling with the transmitter coil 114. In the event of maximum magnetic coupling between the transmitter coil 114 and the main receiver coil 120, a higher voltage is induced across the main receiver coil 120 compared to a voltage induced at the main receiver coil 120 during a misaligned condition of the main receiver coil 120 with respect to the transmitter coil 114. In such a scenario, the voltage induced across the auxiliary receiver coils 122 is a considerably lower value. However, a cumulative voltage across the main output terminal of the main converter 124 and the auxiliary output terminal of the auxiliary converters 126 is a relatively higher value, for example, 'X' volts.

In another scenario where the main receiver coil 120 is misaligned with respect to the transmitter coil 114, at least one of the auxiliary receiver coils 122 may be in alignment with the transmitter coil 114. It should be noted herein that if a central axis of the transmitter coil 114 is aligned with a central axis of the auxiliary receiver coil 122, the transmitter coil 114 is aligned with the auxiliary receiver coil 122. In such a scenario, a voltage induced at the particular auxiliary receiver coil 122, which is in alignment with the transmitter coil 114, is higher than a voltage induced in the other auxiliary coils 122. Here again, a cumulative voltage across main terminal of the main converter 124 and the auxiliary terminal of the auxiliary converters 126 is a higher value, for example, 'Y' volts, where 'Y' volts is approximately equal to 'X' volts. The cumulative voltage 'Y' volts is induced without a significant increase in a magnitude of the current flowing in the transmitter coil 114. Thus, even during a misaligned condition of the main receiver coil 120 with respect to the transmitter coil 114, a desired voltage required is provided to the load without a significant increase in the magnitude of the current flowing in the transmitter coil 114. Accordingly, an efficiency of power transfer in the wireless power transfer system 100 is not compromised even in the event of misalignment of the main receiver coil 120 with respect to the transmitter coil 114.

Additionally, in conventional wireless power transfer systems, communication between a receiver coil and a transmitter coil is hindered if the receiver coil is misaligned with respect to the transmitter coil. In accordance with the embodiment of the present specification, use of the of the auxiliary receiver coils 122, enhances communication between the receiver unit 108 and the transmitter unit 106 compared to a conventional wireless power transfer system having a receiver unit devoid of auxiliary receiver coils.

It may be noted that in a typical wireless power transfer system, a transmitter unit is configured to communicate with a receiver unit. In particular, the receiver unit sends configuration and control feedback signals to the transmitter unit, about a status of the receiver unit such that the transmitter unit can determine whether to transmit power to the receiver unit. In one embodiment, the status of the receiver unit may be a presence of the receiver unit proximate to the transmitter unit. In conventional wireless power transfer systems, when a receiver coil is misaligned with respect to a transmitter coil, communication between the receiver unit and the transmitter unit is affected and hence, the transmitter unit fails to receive the feedback signals from the receiver unit. Lack of communication between the receiver unit and the transmitter unit causes the transmitter unit to stop supply of power to the receiver unit. In accordance with the example embodiment of the present disclosure, use of auxiliary receiver coils 122 aids in continuous communication between the receiver unit 108 and the transmitter unit 106 even when the main receiver coil 120 is in a misaligned condition with respect to the transmitter coil 114. In accordance with aspects of the present specification, even if the main receiver coil 120 is misaligned with respect to the transmitter coil 114, at least one of the auxiliary receiver coils 122 is aligned with the transmitter coil 114. Hence, the receiver unit 108 continues to send feedback signals to the transmitter unit 106. This aids in maintaining continuity in communication between the transmitter unit 106 and the receiver unit 108.

Figure 1B:
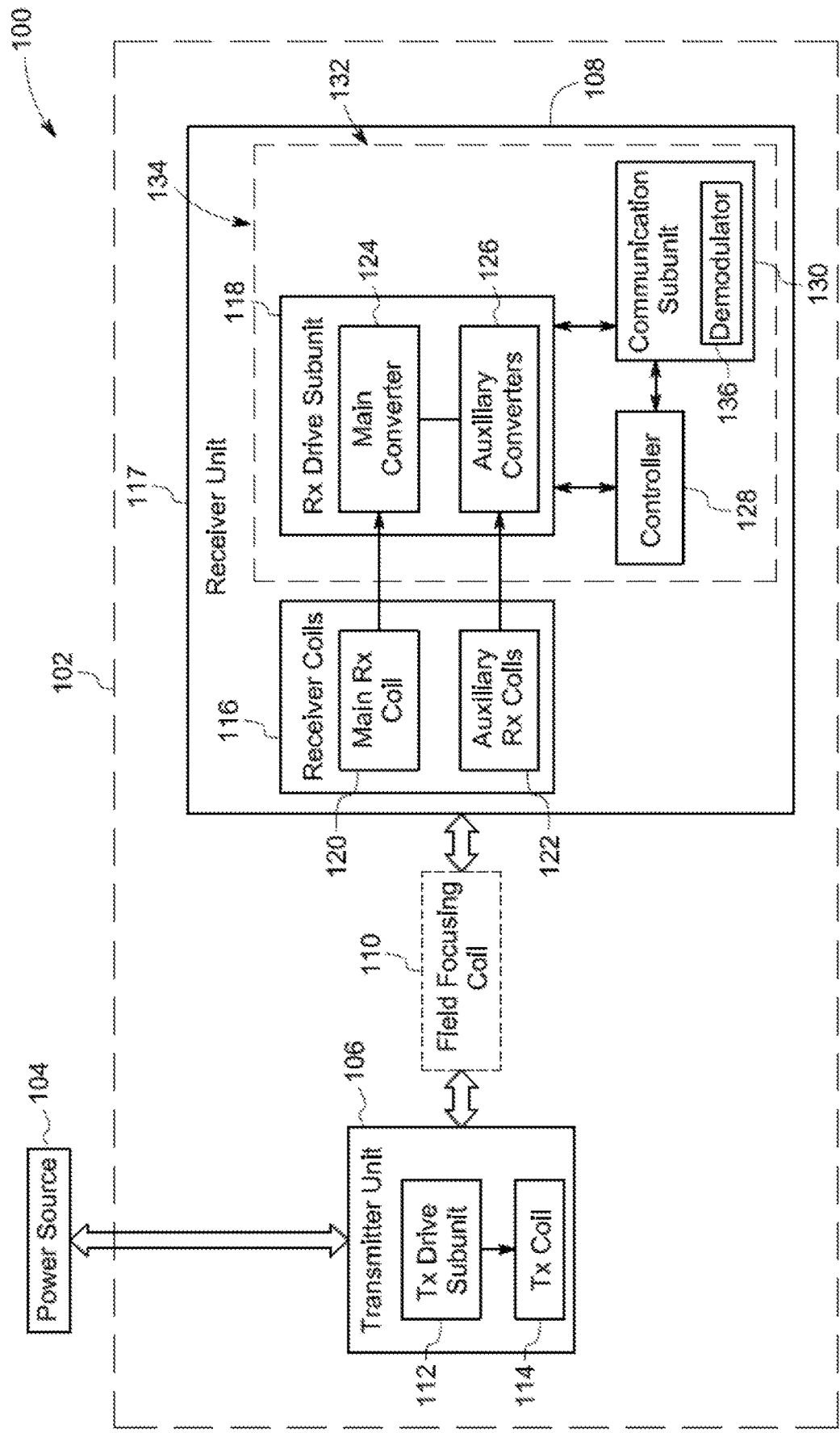
FIG. 1B is a block diagram of another example wireless power transfer system.

FIG. 1B is a block diagram of another example wireless power transfer system based on the wireless power transfer system 100 described with regard to FIG. 1A. The wireless power transfer system 100 includes a wireless power transfer unit 102 and a power source 104. In the illustrated embodiment, the wireless power transfer unit 102 includes a transmitter unit 106, a receiver unit 108, and a field focusing coil 110 as described in FIG. 1A. In the example of FIG. 1B, the receiver unit 108 includes an integrated electronic component 117.

Conventionally, switches and other electronics of a receiver unit are discrete electronic components soldered to a printed circuit board. Use of these discrete electronic components increases footprint of such a receiver unit. As a result, use of the receiver unit in compact devices, like mobile phones, laptops, and the like can be a challenge. The above-mentioned drawbacks associated with the conventional receiver unit may be overcome by use of the example integrated electronic component 117. In particular, the integrated electronic component 117 includes electronics of the receiver unit 108. More particularly, the integrated electronic component 117 includes the first switches of the receiver drive subunit 118, the second switch of the communication subunit 130, the demodulator 136, connections between the first switches, connections between the communication subunit 130 and receiver drive subunit 118, formed on the substrate 132. In a similar manner, any other associated electronic switches of the receiver unit 108 may be formed on the substrate 132. In one embodiment, the substrate may be a thin silicon wafer. Further, the controller 128 is disposed on the substrate 132. Furthermore, the substrate 132 is packaged in a package unit 134 to provide externally extending connection pins.

The integrated electronic component 117 has a substantially lower footprint, thereby facilitating easy incorporation of the integrated electronic component 117 into compact devices such as the mobile phone, for example. Moreover, use of the integrated electronic component 117 facilitates to reduce effects of circuit parasitics, such as track impedance and associated voltage drop. Furthermore, use of the integrated electronic component 117 facilitates to enhance misalignment tolerance compared to use a conventional receiver drive subunit having discrete electronic components.

The integrated electronic component 117 is an integrated circuit (IC). In one embodiment, the integrated electronic component 117 may be an application specific integrated circuit (ASIC), a very large-scale integration (VLSI) chip, a microelectromechanical system (MEMS), or system on chip (SoC). The integrated electronic component 117 also includes a receiver drive subunit 118, a controller 128, a communication subunit 130, and a substrate 132. The controller 128, the communication subunit 130, and the receiver drive subunit 118 are disposed/formed on the substrate 132. In one embodiment, the substrate 132 may include a silicon wafer.

The controller 128 includes a microcontroller, a microprocessor, a processing unit, microcomputer, digital signal processors (DSPs), field programmable gate arrays (FPGAs), and/or any other programmable circuits or the like. Further, the controller 128 is operatively coupled to the receiver drive subunit 118 and the communication subunit 130. In particular, the controller 128 is operatively coupled to the common output terminal and alternating current (AC) terminal of the receiver drive subunit 118. The alternating current terminal of the receiver drive subunit 118 includes alternating current terminal of the main converter 124 and alternating current terminals of the auxiliary converters 126. The communication subunit 130 includes at least one second switch. The at least one second switch includes semiconductor switches, such as an insulated gate bipolar transistor, a metal oxide semiconductor field effect transistor, a field-effect transistor, an injection enhanced gate transistor, an integrated gate commutated thyristor, a gallium nitride based switch, a silicon carbide based switch, a gallium arsenide based switch, diodes, or the like.

The controller 128 is configured to determine one or more circuit parameters of the receiver drive subunit 118. In particular, the controller 128 is configured to determine the one or more circuit parameters of at least one of the common output terminal, an alternating current terminal of the main converter 124, and alternating current terminals of the plurality of auxiliary converters 126. The term 'circuit parameters,' as used herein, may refer to voltage, current, frequency, and power. Further, the controller 128 is configured to control operation of the communication subunit 130 based on the determined circuit parameters. In particular, the controlling operation of the communication subunit 130 includes activating/deactivating the at least one second switch.

It should be noted herein that the controlling operation of the communication subunit 130 causes a variation in an impedance of the receiver unit 108. In particular, the impedance loading the main receiver coil 120 and the impedance loading the auxiliary receiver coils 122, as seen from the transmitter unit 106 end is varied. As a result of variation of the impedance, a current at the transmitter unit 106 varies. Accordingly, a communication between the transmitter unit 106 and the receiver unit 108 is established.

In another embodiment, the transmitter unit 106 is also configured to communicate with the receiver unit 108. Hence, a bidirectional communication between the transmitter unit 106 and the receiver unit 108 is desirable. Information is transmitted from the transmitter unit 106 to the receiver unit 108 by varying a frequency/amplitude of a voltage signal at the transmitter unit 106. In one example, the information transmitted from the transmitter unit 106 may be representative of power providing capability of the transmitter unit 106. In another example, the information transmitted from the transmitter unit 106 may be representative of an identification packet for the corresponding transmitter unit 106. Voltage signals at at least one of the alternating current terminals of the main converter 124 and plurality of auxiliary converters 126 is varied as a result of the variation of the frequency/amplitude of the voltage signal at the transmitter unit 106. Subsequently, the voltage signal at at least one of the alternating current terminals of the main converter 124 and plurality of auxiliary converters 126 is demodulated by a demodulator 136 of the communication subunit 130. Accordingly, the information transmitted from the transmitter unit 106 is interpreted at the receiver unit 108. Further, the demodulator 136 provides a demodulated signal to the controller 128 for subsequent action. In one embodiment, the demodulated signal is obtained by using techniques, such as but not limited to frequency and/or amplitude demodulation, frequency shift keying demodulation, and amplitude shift keying demodulation.

Figure 2:
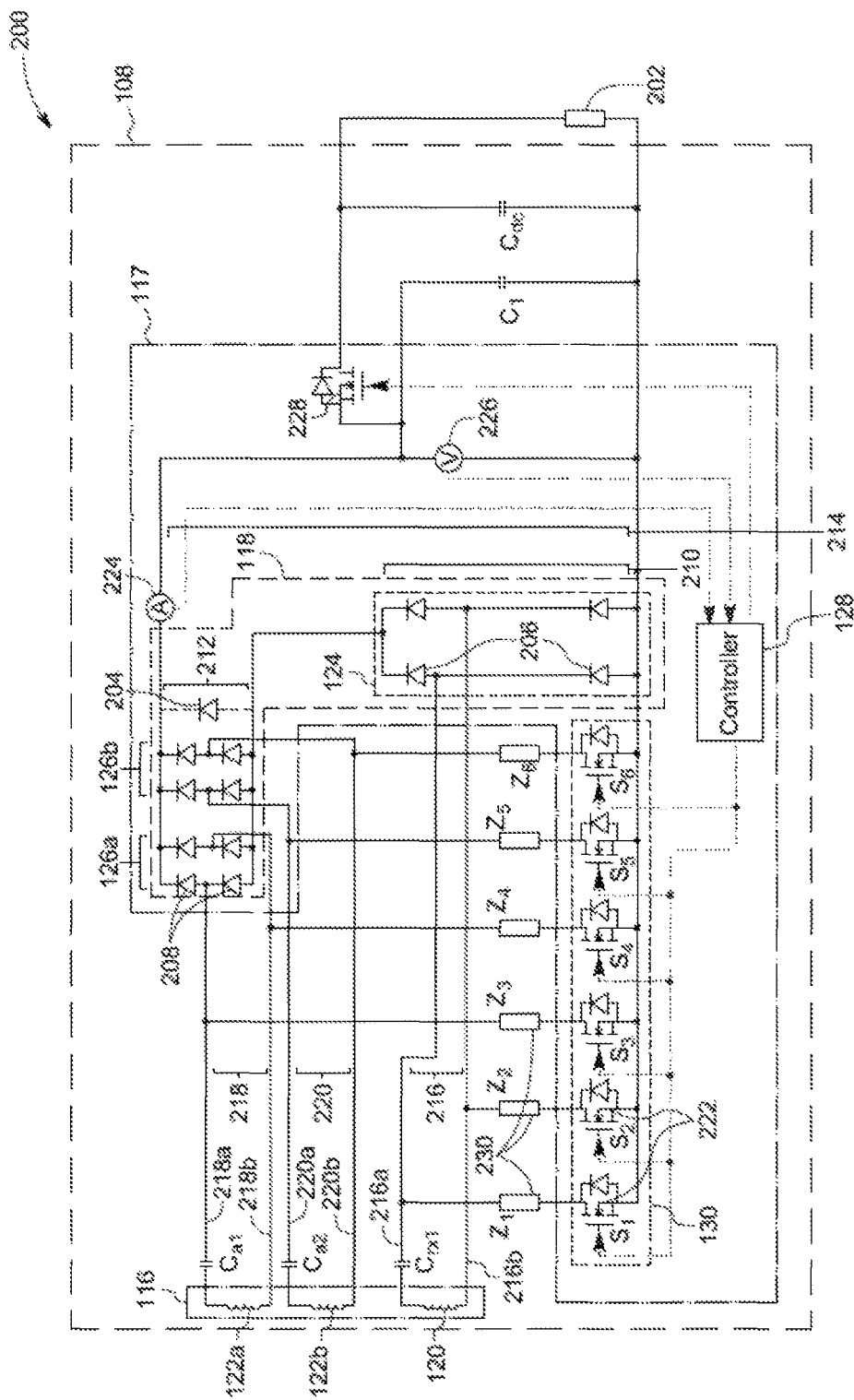
FIG. 2 is a schematic representation of an example receiver unit.

FIG. 2 is a schematic representation 200 of an example receiver unit 108. For example, the receiver unit 108 may be used in the wireless power transfer system 100 of FIGS. 1A and 1B. In the illustrated embodiment, the receiver unit 108 is coupled to a load 202. In one embodiment, the load 202 includes a battery pack or battery charger. The receiver unit 108 includes the receiver coil 116 and the integrated electronic component 117. The receiver coil 116 includes the main receiver coil 120 and two auxiliary receiver coils 122a, 122b. The main receiver coil 120 and the auxiliary receiver coils 122a, 122b are resonant coils. The main receiver coil 120 is coupled to a capacitor $C_{rx1}$. Further, the auxiliary receiver coil 122a is coupled to a capacitor $C_{a1}$ and the auxiliary receiver coil 122b is coupled to another capacitor $C_{a2}$.

The integrated electronic component 117 includes the substrate 132, the receiver drive subunit 118, the controller 128, and the communication subunit 130. The receiver drive subunit 118 and the communication subunit 130 are formed on the substrate. Further, the controller 128 is disposed on the substrate. Further, the substrate 132 along with the receiver drive subunit 118, the controller 128, and the communication subunit 130 are disposed within a package unit (not shown) to form a compact integrated electronic component 117. In one example, the substrate 132 along with the receiver drive subunit 118, the controller 128, and the communication subunit 130 are hermetically sealed in the package unit.

In the illustrated embodiment, the receiver drive subunit 118 includes the main converter 124 and a plurality of auxiliary converters 126a, 126b. The main receiver coil 120 is coupled to the main converter 124. The auxiliary receiver coil 122a is coupled to the auxiliary converter 126a and the other auxiliary receiver coil 122b is coupled to the auxiliary converter 126b. Further, an alternative switch 204 such as a diode is coupled across the auxiliary converters 126a, 126b. The alternative switch 204 may also be referred to as a third switch.

The main converter 124 includes the first switches 206. Further, the auxiliary converters 126a, 126b includes the first switches 208. In the illustrated embodiment, the first switches 206, 208 include a diode. In another embodiment, the first switches 206, 208 may include semiconductor switches such as an insulated gate bipolar transistor, a metal oxide semiconductor field effect transistor, a field-effect transistor, an injection enhanced gate transistor, an integrated gate commutated thyristor, a gallium nitride based switch, a silicon carbide based switch, a gallium arsenide based switch, or the like. Further, the main converter 124 and auxiliary converters 126a, 126b include a passive rectifier. In another embodiment, the main converter 124 and auxiliary converters 126a, 126b may include a hybrid rectifier and an active rectifier. The term 'hybrid rectifier,' as used herein, refers to a rectifier circuit having a combination of passive switches and active switches.

The main converter 124 includes the main output terminal 210. The auxiliary converter 126a is coupled in parallel to the auxiliary converter 126b to form an auxiliary output terminal 212. Further, the main output terminal 210 is coupled in series to the auxiliary output terminal 212 to form a common output terminal 214. Furthermore, the load 202 is coupled across the common output terminal 214.

Further, the main converter 124 includes an alternating current terminal 216 having two branches 216a, 216b. The auxiliary converter 126a includes an alternating current terminal 218 and the auxiliary converter 126b includes an alternating current terminal 220. The alternating current terminal 218 includes two branches 218a, 218b. Further, the alternating current terminal 220 include two branches 220a, 220b.

Further, the receiver unit 108 includes an output enable switch 228 formed on the substrate 132. Further, the receiver unit 108 includes capacitors $C_1$ and $C_{dc}$ coupled to the output enable switch 228. The capacitor $C_1$ is coupled in parallel to the common output terminal 214. Furthermore, the load 202 is coupled parallel to the capacitor $C_{dc}$. It should be noted herein that the capacitors $C_1$ and $C_{dc}$ and the load 202 do not form a part of the integrated electronic component 117.

Additionally, the receiver unit 108 includes a plurality of impedance components 230. For the ease of representation, the plurality of impedance components 230 are also represented as $Z_1$, $Z_2$, $Z_3$, $Z_4$, $Z_5$, and $Z_6$. The plurality of impedance components 230 are disposed external to the integrated electronic component 117.

The communication subunit 130 includes a plurality of second switches 222 coupled to each other. For ease of representation, the plurality of second switches 222 is also represented as $S_1$, $S_2$, $S_3$, $S_4$, $S_5$, and $S_6$. The plurality of second switches 222 includes semiconductor switches such as an insulated gate bipolar transistor, a metal oxide semiconductor field effect transistor, a field-effect transistor, an injection enhanced gate transistor, an integrated gate commutated thyristor, a gallium nitride based switch, a silicon carbide based switch, a gallium arsenide based switch, a diode, or the like.

Further, the communication subunit 130 is coupled to the alternating current terminals 216, 218, 220. In particular, the second switches 222 are coupled to the alternating current terminals 216, 218, 220 via the impedance components 230. More particularly, the switch $S_1$ is coupled to the branch 216a via the impedance component $Z_1$ and the switch $S_2$ is coupled to the branch 216b via the impedance component $Z_2$. Further, the switch $S_3$ is coupled to the branch 218a via the impedance component $Z_3$ and the switch $S_4$ is coupled to the branch 218b via the impedance component $Z_4$. Furthermore, the switch $S_5$ is coupled to the branch 220a via the impedance component $Z_5$ and the switch $S_6$ is coupled to the branch 220b via the impedance component $Z_6$.

The controller 128 is coupled to a current sensor 224 and a voltage sensor 226. In particular, the controller 128 is configured to determine circuit parameters such as value of current and voltage at the common output terminal 214. More particularly, the controller 128 is configured to receive the values of current at the common output terminal 214 measured by the current sensor 224. In another embodiment, the current sensor 224 can be located after the capacitor $C_1$ in series with the switch 228. Further, the controller 128 is configured to receive the value of voltage at the common output terminal 214 measured by the voltage sensor 226. Further, the controller 128 is configured to activate and/or deactivate the output enable switch 228. Furthermore, the controller 128 is configured to activate and/or deactivate the second switches 222 of the communication subunit 130 based on the determined circuit parameters.

A method of manufacturing the integrated electronic component 117 involves a first step of designing an electric circuit to be formed on the substrate 132. In the illustrated example of FIG. 2, the electrical circuit includes first switches 206, 208, connections between the first switches 206, 208, the second switches 222, connections between the second switches 222, connections between the first switches 206, 208 and the second switches 222, the output enable switch 228, the alternative switch 204, connection of the alternative switch 204 to the auxiliary output terminal 212, the connection of the output enable switch 228 to the common output terminal 214, and the demodulator 136.

At a second step, a circuit layout of the electrical circuit that needs to be disposed on the substrate 132 is designed using different tools such as Verilog, MATLAB, Simulink, VHDL, and the like. The circuit layout includes different patterns corresponding to different process layers such as a N+ diffusion layer, a P+ diffusion layer, a metal layer, a N-well layer, a contact cut layer, a polysilicon layer, and the like.

At a third step, a mask is manufactured for each of the process layers. For example, one mask may correspond to the N+ diffusion layer and another mask may correspond to the contact cut layer. In a similar manner, masks for other process layers are manufactured. It should be noted herein that a mask is formed by etching the pattern of each process layer on a corresponding glass sheet. A plurality of such masks corresponding to the process layers is produced.

Further, at a fourth step, each mask is used to develop a corresponding pattern on the substrate 132 using a photolithography technique to form a corresponding process layer. Accordingly, the process layers are developed on the substrate 132 to form the electrical circuit.

At a fifth step, the controller 128 is disposed on the substrate 132 at a designated location to establish connection to the second switches 222, the output enable switch 228, and the common output terminal 214. Subsequently, at a sixth step, the substrate 132 is disposed in the package unit 134 to provide exteriorly extending connection pins.

During operation of the wireless power transfer system 100, during an initial state, such as at a time instant t=0, the main receiver coil 120 or the auxiliary receiver coils 122a, 122b are powered by the transmitter coil 114. Further, at time t=0, the transmitter unit 106 may be configured to send ping signals to the receiver unit 108. In one embodiment, the ping signals may be a variation in power at the transmitter unit 106 which may cause a variation of the circuit parameters at the receiver unit 108. These circuit parameters may include the voltage, current, or power (or any combination thereof) at the common output terminal 214, in one example. Also, at the time instant t=0, the output enable switch 228 may be in a deactivated state.

Subsequently, for example, at a time instant $t=t_1$, the receiver unit 108 acknowledges the ping signal sent from the transmitter unit 106. In particular, the receiver unit 108 may be configured to send an information having one or more bit patterns, such as a 11-bit pattern. In one embodiment, the bit patterns may be representative of the signal strength received by the receiver unit 108 and/or an identification information of the receiver unit 108. The ping signal sent from the transmitter unit 106 and the acknowledgement sent by the receiver unit 108 is indicative of the communication between the receiver unit 108 and the transmitter unit 106. Further, at the time instant $t=t_2$, where $t_2>t_1$, the output enable switch 228 may be activated. The output enable switch 228 may be activated by providing a gate control signal to the output enable switch 228 by the controller 128.

Moreover, to enable communication between the transmitter unit 106 and the receiver unit 108, the controller 128 controls switching of the switches $S_1$ and $S_2$ based on the measurement of circuit parameters at the common output terminal 214. In particular, the controller 128 is configured to activate and/or deactivate the switches $S_1$ and $S_2$ by providing the corresponding gate control signal to the switches $S_1$ and $S_2$. In one embodiment, when the switch $S_1$ is activated, the switch $S_2$ is also activated. The impedance loading the main receiver coil 120, as seen by the transmitter unit 106 end varies based on activation and/or deactivation of the switches $S_1$ and $S_2$. As a result, the value of current at the transmitter unit 106 is varied. The variation of current at the transmitter unit 106 is in the form of the bit pattern is configured to provide information to the transmitter unit 106.

Information is representative of performance parameters of the receiver unit 108, in one example. This information is transmitted by the receiver unit 108 to the transmitter unit 106 at regular intervals. In particular, information representative of the type of connected load, an amount of power, voltage, or current demanded by the load 202, control error, such as, a output voltage error are transmitted by the receiver unit 108. Accordingly, a controller at the transmitter unit 106 may be configured to regulate the power provided from the transmitter unit 106 to meet any demand of the load.

Furthermore, the switches $S_1$ to $S_6$ are switched synchronously. In one embodiment, the controller 128 controls switching of the switches $S_3$ and $S_4$ based on the measurement of circuit parameters at the common output terminal 214. The impedance loading the auxiliary receiver coil 122a, as seen from the transmitter unit 106 end is varied based on the switching of the switches $S_3$ and $S_4$. As a result, the value of current at the transmitter unit 106 is varied. The variation of current at the transmitter unit 106 is in a form of a bit pattern such as a 11-bit pattern configured to provide information to the transmitter unit 106. A controller of the transmitter unit 106 may be configured to regulate power provided from the transmitter unit 106 to meet a demand of the load 202. The combination of switches $S_1$, $S_2$, $S_3$, $S_4$, $S_5$, and $S_6$ which are coupled to the main receiver coil 120 and the auxiliary receiver coils 122a, 122b, facilitates to enhance communication between the receiver unit 108 and the transmitter unit 106 compared to an embodiment having only the switches $S_1$ and $S_2$.

In one embodiment, when the main receiver coil 120 is aligned with the transmitter coil 114, the auxiliary converters 126a, 126b may contribute a low value of voltage to the load 202. In such an embodiment, the alternative switch 204 provides a path for a flow of current to prevent flow of current through the auxiliary converters 126a, 126b. Accordingly, losses in the auxiliary converters 126a, 126b is avoided.

In certain other embodiments, if the transmitter unit 106 is supplying power but instead of the receiver coils 120, 122a, 122b a foreign object is in the vicinity of the transmitter unit 106, the foreign object may not communicate with the transmitter unit 106. Accordingly, the transmitter unit 106 does not provide power and thereby prevents localized heating at the location of the foreign object. The foreign object may be any metallic object, in one example.

In yet another embodiment, a foreign object in combination with at least one of the receiver coils 120, 122a, 122b may be drawing power from the transmitter unit 106. In such an embodiment, the presence of the foreign object is detected by comparing a value of power received at the receiver coils 120, 122a, or 122b with a value of power transmitted from the transmitter unit 106. If the difference between the value of the power transmitted from the transmitter unit 106 and the value of power received at the receiver coils 120, 122a, or 122b is higher than a determined threshold value, the presence of the foreign object is detected. Accordingly, the transmitter unit 106 terminates supply of power and thereby prevents localized heating at the location of the foreign object.

Although the embodiment of FIG. 2 shows auxiliary converters 126a, 126b coupled in parallel to each other, in other embodiments, the auxiliary converters 126a, 126b may also be coupled to each other in series. Further, although two auxiliary receiver coils 120a, 120b and corresponding auxiliary converters 126a, 126b are represented, in other embodiments, a number of auxiliary receiver coils and corresponding auxiliary converters may vary depending on the application.

Figure 3:
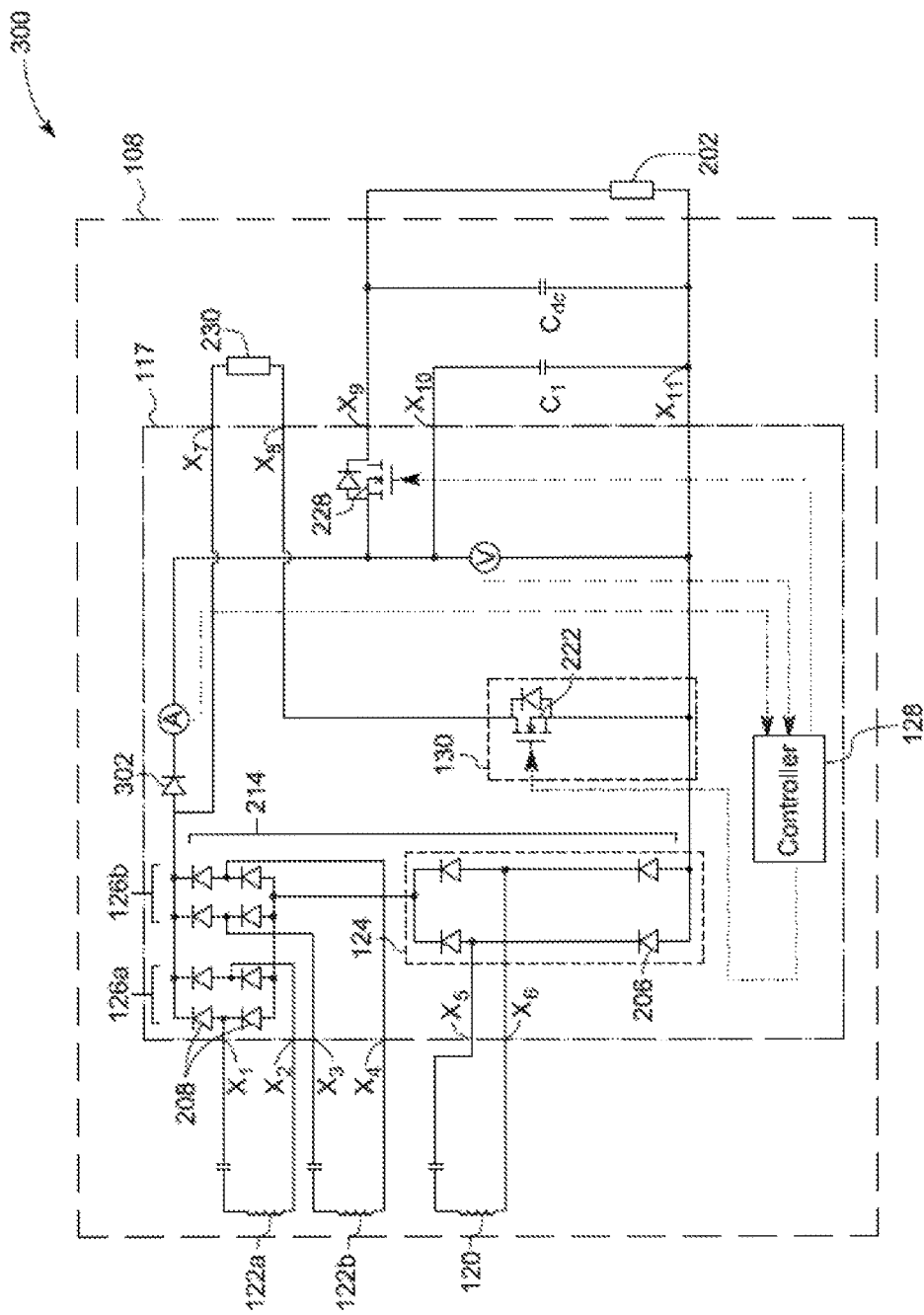
FIG. 3 is a schematic representation of another example receiver unit.

FIG. 3 is a schematic representation of one embodiment 300 of the receiver unit 108 of the wireless power transfer system 100. As discussed earlier, the receiver unit 108 is coupled to the load 202. The receiver unit 108 includes the receiver coil 116 and the integrated electronic component 117.

In the illustrated embodiment, the integrated electronic component 117 includes the substrate 132, the controller 128, and the communication subunit 130. Furthermore, the integrated electronic component 117 includes a diode 302 and the output enable switch 228. In the example of FIG. 3, the communication subunit 130 is operatively coupled to the common output terminal 214. In one embodiment, the second switch 222 of the communication subunit 130 is operatively coupled to the common output terminal 214 via the corresponding impedance component 230.

As discussed earlier, the controller 128 is configured to measure the circuit parameters such as voltage, current, and/or power of the common output terminal 214. The controller 128 is configured to control activation and/or deactivation of the second switch 222 based on the measured circuit parameters. Further, the controller 128 is configured to control activation and/or deactivation of the output enable switch 228.

In one embodiment, the integrated electronic component 117 is an integrated circuit. In one embodiment, the integrated circuit is an application specific integrated circuit (ASIC). The integrated electronic component 117 is packaged in such a manner to provide externally extending connection pins. In the illustrated embodiment, the connections pins may be available at locations $X_1$, $X_2$, $X_3$, $X_4$, $X_5$, $X_6$, $X_7$, $X_8$, $X_9$, $X_{10}$, $X_{11}$. The external components such as the receiver coils 120, 122a, 122b, the impedance component 230, and the load 202 may be coupled to the connections pins at the locations $X_1$, $X_2$, $X_3$, $X_4$, $X_5$, $X_6$, $X_7$, $X_8$, $X_9$, $X_{10}$, $X_{11}$. Further, the integrated electronic component 117 may include additional connection pins for connecting to other external electrical, or electronic components (not disclosed herein).

During operation of the wireless power transfer system 100, at the time instant time t=0, the receiver unit 108 is powered by the transmitter unit 106. Further, at time t=0, the transmitter unit 106 may be configured to send ping signals to the receiver unit 108. The receiver unit 108 acknowledges the ping signals sent from the transmitter unit 106. The controller 128 activates the output enable switch 228 subsequent to the acknowledgement by the receiver unit 108.

In order to communicate from the receiver unit 108 to the transmitter unit 106, the controller 128 may activate or deactivate the second switch 222. When the second switch 222 is activated, the impedance component 230 is connected across the common output terminal 214. As a result, the impedance loading the receiver coils 120, 122a, 122b, as seen by the transmitter unit 106, varies. As a result of variation of impedance, a current at the transmitter coil 114 may vary in such a manner that a 11-bit pattern is obtained at the transmitter unit 106. Accordingly, information is transmitted from the receiver unit 108 to the transmitter unit 106. The information may be representative of the value of power or a control error that needs to be provided to the load 202. Once the information is received at the transmitter unit 106, the power, voltage, current, or frequency (or a combination thereof) at the transmitter unit 106 may be controlled by the controller 128.

As noted hereinabove, when the second switch 222 is activated, the impedance component 230 is connected across the common output terminal 214. If the diode 302 is not present, activation of the second switch 222 also provides one closed path via the second switch 222, the impedance component 230, the output enable switch 228, the capacitor $C_{dc}$, and back to the second switch 222. Further, another closed path is provided via the second switch 222, the impedance component 230, the capacitor $C_1$, and back to the second switch 222. In such a scenario, the capacitors $C_1$ and $C_{dc}$ may discharge via the corresponding closed paths.

The capacitor $C_{dc}$ is a load capacitor. The discharge of the capacitor $C_{dc}$ results in loss of stored energy at a load terminal. In one example, the load terminal includes input terminals of a charger stage of a battery of a mobile phone. Hence, the discharge of the capacitor $C_{dc}$ needs to be prevented. Further, $C_1$ is the capacitor across which the circuit parameters of the common output terminal 214 are measured by the controller 128. The discharge of the capacitor $C_1$ may cause an undesirable variation in the voltage across the capacitor $C_1$. The variation in voltage across the capacitor $C_1$ may cause inaccurate measurement of circuit parameters at the common output terminal. Hence, the discharge of the capacitor $C_1$ needs to be prevented.

In order to avoid discharge of the capacitors $C_1$ and $C_{dc}$, the diode 302 is employed. The use of the diode 302 blocks the flow of current from the capacitors $C_1$ and $C_{dc}$. As a result, the discharge of the capacitors $C_1$ and $C_{dc}$ is prevented.

Figure 4:
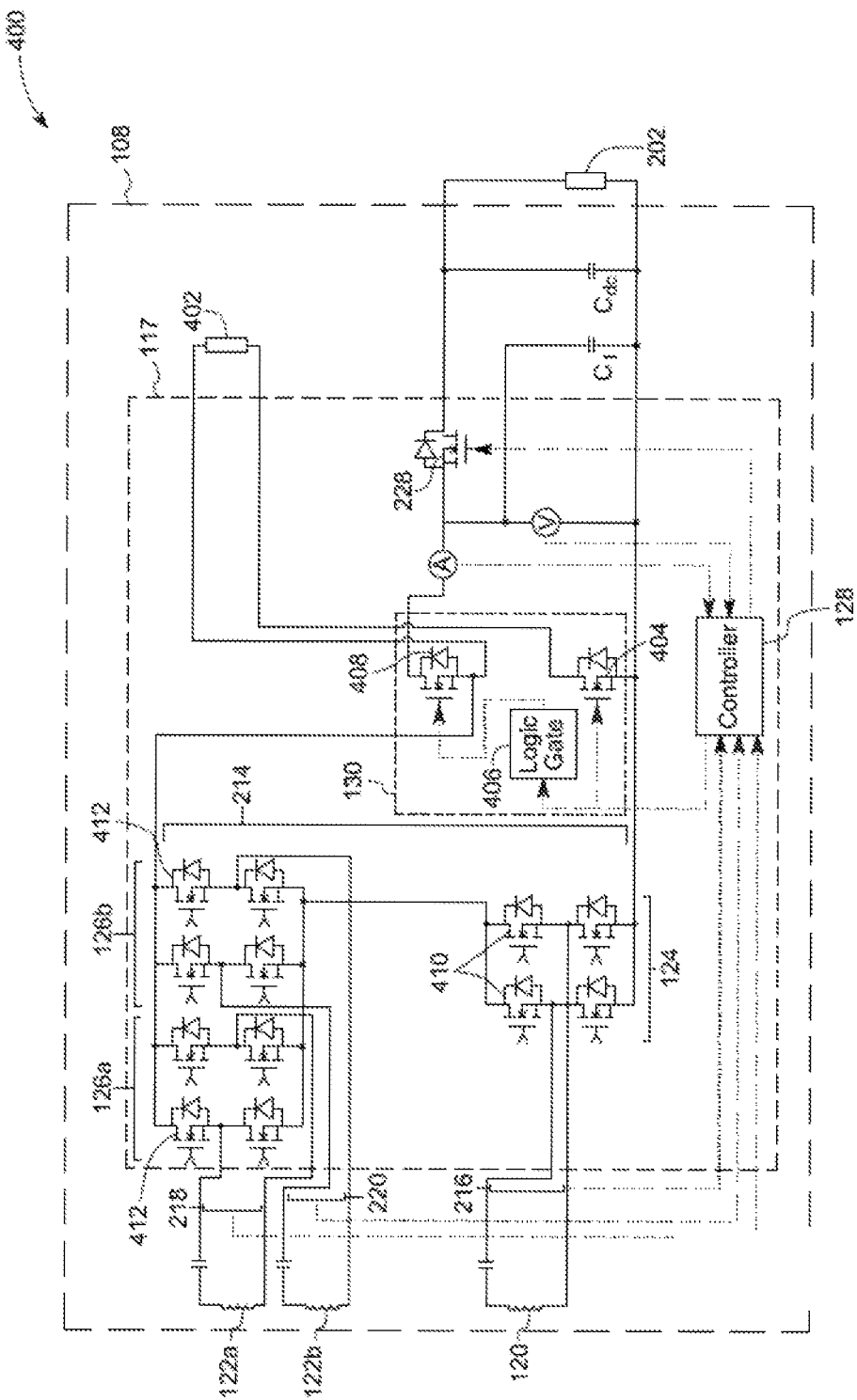
FIG. 4 is a schematic representation of another example receiver unit.

FIG. 4 is a schematic representation of another embodiment 400 of the receiver unit 108. As discussed earlier, the receiver unit 108 is coupled to the load 202. The receiver unit 108 includes the main receiver coil 120, the auxiliary receiver coils 122a, 122b, and the integrated electronic component 117. The integrated electronic component 117 includes the substrate 132, the main converter 124, the auxiliary converters 126a, 126b, the controller 128, the communication subunit 130, and the output enable switch 228.

The communication subunit 130 includes switches 404, 408, and a NOT logical gate 406. The switch 404 may be alternatively referred to as a second switch. A gate signal is provided to a gate terminal of the switch 404. This gate signal is inverted using the NOT logical gate 406 and an inverted gate signal is provided to a gate terminal of the switch 408. The activation/deactivation of the switches 404, 408 is determined based on the gate signals at the gate terminals of the switches 404, 408. In one embodiment, when the gate signals corresponding to the switches 404, 408 are high, the switches 404, 408 are configured to be activated. In another embodiment, when the gate signals corresponding to the switches 404, 408 are low, the switches 404, 408 are configured to be deactivated.

The receiver unit 108 further includes an impedance component 402. The impedance component 402 is disposed externally to the integrated electronic component 117. Further, the receiver unit 108 includes a capacitor $C_1$ coupled across the common output terminal 214. Furthermore, the capacitor $C_{dc}$ is coupled across the load 202. The output enable switch 228 is coupled to the capacitors $C_1$ and $C_{dc}$. The capacitors $C_1$ and $C_{dc}$ are also disposed externally to the integrated electronic component 117.

During operation of the receiver unit 108, at least one of the auxiliary receiver coils 122a, 122b or main receiver coil 120 is powered by the transmitter coil 114. Subsequently, the output enable switch 228 is activated based on the communication between the transmitter unit 106 and the receiver unit 108. Further, the controller 128 measures the circuit parameters at the common output terminal 214. Furthermore, the controller 128 controls operation of the communication subunit 130 based on the measured circuit parameters. In particular, the controller 128 controls operations of the switch 404 based on the measured circuit parameters.

Accordingly, the switch 404 is activated and/or deactivated. When the switch 404 is activated, the impedance component 402 is coupled across the common output terminal 214. Accordingly, the impedance loading the receiver coils 120, 122a, 122b as seen from the transmitter unit 106 end changes. The change in impedance is reflected as a change in current at the transmitter unit 106.

As a result of activation and/or deactivation of the switch 404, the current at the transmitter coil 114 is varied in such a manner that a bit pattern is obtained at the transmitter unit 106. Accordingly, the information is transmitted from the receiver unit 108 to the transmitter unit 106.

It may be noted that if both the switches 404 and 408 are activated at same period of time, a closed path is formed via the switch 404, the impedance component 402, the switch 408, the output enable switch 228, the capacitor $C_{dc}$, and back to the switch 404. As a result, the capacitor $C_{dc}$ may discharge via the switch 408, the impedance component 402, and the switch 404. In a similar manner, the capacitor $C_1$ may be discharged. In order to avoid discharge of the capacitors $C_1$ and $C_{dc}$, the switch 408 has to be deactivated. According to aspects of the present specification, when the switch 404 is activated, the switch 408 is deactivated. The gate signal provided at the gate terminal of the switch 404 is inverted by the NOT logic gate 406 and provided to the gate terminal of the switch 408. Accordingly, the switch 408 is deactivated. As a result of deactivation of the switch 408, the capacitors $C_1$ and $C_{dc}$ are disconnected from the common output terminal 214, thereby preventing discharge of the capacitors $C_1$ and $C_{dc}$.

Further, the controller 128 measures circuit parameters at the alternating current terminal 216 of the main converter 124 and the alternating current terminals 218, 220 of the auxiliary converters 126a, 126b respectively. The controller 128 further determines pattern of switching of first switches 410 of the main converter 124 based on circuit parameters at the alternating current terminal 216 of the main converter 124. Further, the controller 128 determines the pattern of switching of first switches 412 of the auxiliary converters 126a, 126b based on the circuit parameters corresponding to the alternating current terminals 218, 220 of the auxiliary converters 126a, 126b. The term "pattern of switching," as used herein, may refer to pattern of activating/deactivating the first switches 412. Although the example of FIG. 4 refers to use of the controller 128 to switch the first switches 410, 412, use of a separate controller for switching the first switches 410, 412 is also envisioned.

Figure 5:
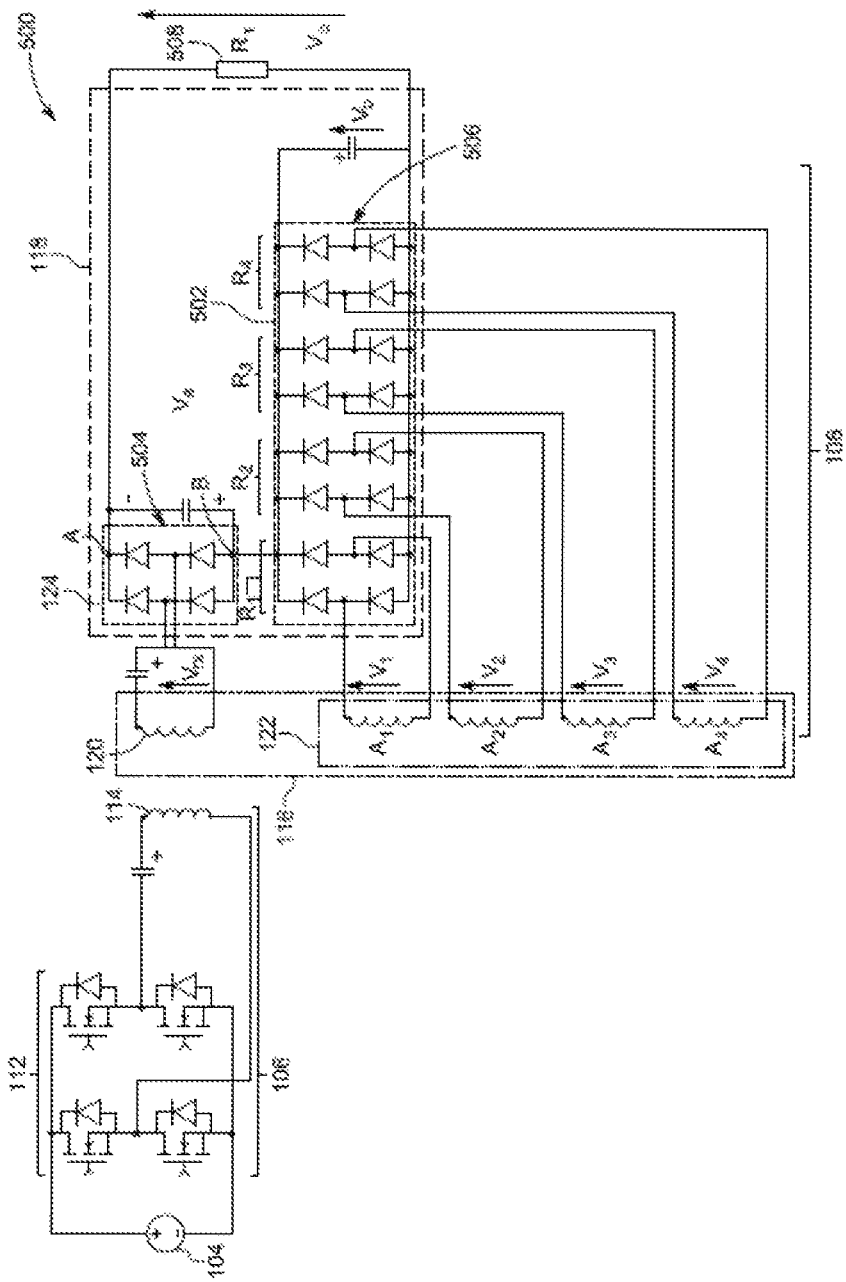
FIG. 5 is a detailed circuit representation of an example wireless power transfer system.

FIG. 5 is a detailed circuit representation of a wireless power transfer system 500 in accordance with one embodiment of the present specification. The wireless power transfer system 100 includes the power source 104, the transmitter unit 106, the receiver unit 108, and a load 508. The power source 104 is coupled to the transmitter unit 106. The transmitter unit 106 is magnetically coupled to the receiver unit 108. Further, the receiver unit 108 is electrically coupled to the load 508.

The receiver unit 108 includes the receiver drive subunit 118 and the receiver coil 116. The receiver coil 116 includes the main receiver coil 120 and the plurality of auxiliary receiver coils 122. The plurality of auxiliary receiver coils 122 is represented as $A_1$, $A_2$, $A_3$, and $A_4$.

The receiver drive subunit 118 includes the main converter 124 and the plurality of auxiliary converters 502. The plurality of auxiliary converters 502 are represented as $R_1$, $R_2$, $R_3$, and $R_4$. In one embodiment, the main converter 124 and the plurality of auxiliary converters 502 are passive rectifiers. In particular, the main converter 124 and the plurality of auxiliary converters 502 are full bridge passive diode rectifiers. The main converter 124 includes a main output terminal 504. The plurality of auxiliary converters 502 is coupled to each other to form an auxiliary output terminal 506. In the illustrated embodiment, the plurality of auxiliary converters 502 is coupled to each other in parallel. The main converter 124 is coupled in series with the plurality of auxiliary converters 502. In particular, the main output terminal 504 is coupled in series with the auxiliary output terminal 506. Further, the load 508 is coupled across the main output terminal 504 and the auxiliary output terminal 506.

In particular, the power source 104 is coupled to the transmitter drive subunit 112. In one embodiment, the power source 104 is a direct current (DC) power source. During operation, the DC power provided by the power source 104 is converted to an alternating current (AC) power by the transmitter drive subunit 112. As a result, current flows through the transmitter coil 114 and a magnetic field is generated. Hence, the transmitter coil 114 is magnetically coupled to the receiver coil 116.

A voltage is induced across the receiver coil 116 due to the magnetic coupling between the transmitter coil 114 and the receiver coil 116. Specifically, a voltage is induced across the main receiver coil 120 and the auxiliary receiver coils 122 based on alignment with the transmitter coil 114. The voltage induced across the main receiver coil 120 and the auxiliary receiver coils 122 may be alternately referred to as the first voltage. For ease of representation, the first voltage induced across the main receiver coil 120 is represented as $V_{rx}$ and the first voltage induced across the plurality of auxiliary coils $A_1$, $A_2$, $A_3$, and $A_4$ are represented as $V_1$, $V_2$, $V_3$, and $V_4$, respectively. Further, the first voltage induced at the main receiver coil 120 is rectified and an output voltage $V_a$ is obtained at the main output terminal 504. The output voltage $V_a$ obtained at the main output terminal 504 is also referred to as a second voltage. The first voltages induced at the auxiliary receiver coils 122 are rectified and an output voltage $V_b$ is obtained at the auxiliary output terminal 506. The output voltage $V_b$ obtained at the auxiliary output terminal 506 is also referred to as a third voltage. Further, a combination of the second and third voltages $V_a$ and $V_b$ is provided to the load 508. In one embodiment, the sum of the voltages $V_a$ and $V_b$ is provided to the load 508.

Figure 9A:
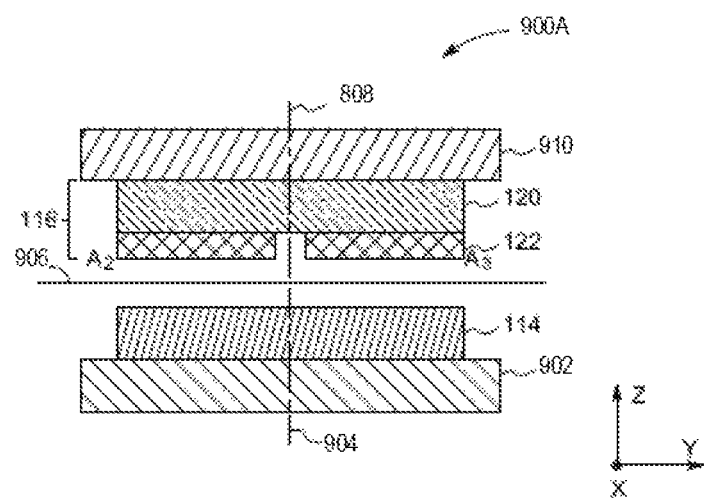
FIGS. 9A and 9B are cross-sectional representations of a portion of an example wireless power transfer unit.

In an embodiment, when the main receiver coil 120 is aligned with the transmitter coil 114, the main receiver coil 120 has maximum magnetic coupling with the transmitter coil 114 compared to auxiliary receiver coils 122 (as depicted in FIG. 9A). Hence, the voltage $V_{rx}$ is greater than voltages $V_1$, $V_2$, $V_3$, or $V_4$. In one embodiment, the voltages $V_1$, $V_2$, $V_3$, and $V_4$ have a negligible value. The voltage $V_{rx}$ is rectified by the main converter 124 and a voltage $V_a$ is generated at the main output terminal 504. Further, at least one of the voltages $V_1$, $V_2$, $V_3$, and $V_4$ is rectified and a voltage $V_b$ is obtained at the auxiliary output terminal 506. Since the voltages $V_1$, $V_2$, $V_3$, and $V_4$ have a negligible value, the voltage $V_b$ has a lower value. The value of voltage $V_b$ is lesser than the value of voltage $V_a$. A combination of the voltages $V_a$ and $V_b$ is provided to the load 508. Thus, a desired voltage is provided to the load 508.

Figure 9B:
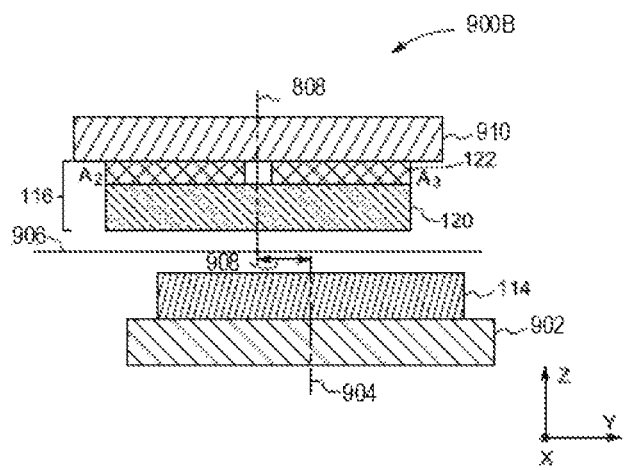

In another embodiment, the auxiliary receiver coil $A_3$ is aligned with the transmitter coil 114 and the main receiver coil 120 is not in alignment with the transmitter coil 114 (as depicted in FIG. 9B). In this scenario, the other auxiliary coils $A_1$, $A_2$, and $A_4$ are also not in alignment with the transmitter coil 114. The auxiliary receiver coil $A_3$ has a maximum magnetic coupling with the transmitter coil 114.

Thus, the voltage induced across the auxiliary receiver coil $A_3$ is higher than the voltage induced across other auxiliary receiver coils $A_1$, $A_2$, and $A_4$. In particular, the voltage $V_3$ is greater than voltages $V_1$, $V_2$, or $V_4$.

Furthermore, the auxiliary converters $R_1$, $R_2$, $R_3$, and $R_4$ are configured to rectify the voltages induced across auxiliary receiver coils $A_1$, $A_2$, $A_3$, and $A_4$, respectively. If the auxiliary converters $R_1$, $R_2$, $R_3$, and $R_4$ are coupled in parallel, the voltages at the output of each auxiliary converter aid in determination of activation and/or deactivation of diodes of the auxiliary converters $R_1$, $R_2$, $R_3$, and $R_4$. Specifically, the voltages at the output of each auxiliary converter enable to determine which converter among the auxiliary converters $R_1$, $R_2$, $R_3$, and $R_4$ is operational. In one example, when the voltage $V_3$ is greater than voltages $V_1$, $V_2$, or $V_4$, the voltage at the output of the auxiliary converter $R_3$ is greater than the voltages at the outputs of the auxiliary converters $R_1$, $R_2$, and $R_4$. If the voltage at the output of the auxiliary converter $R_3$ is greater than the voltage at the output of the auxiliary converters $R_1$, $R_2$, and $R_4$, the voltage at the output of the auxiliary converter $R_3$ reverse biases the diodes of the auxiliary converters $R_1$, $R_2$, and $R_4$. Therefore, the auxiliary converters $R_1$, $R_2$, and $R_4$ are in a deactivated state and do not contribute towards rectification of the voltages $V_1$, $V_2$, and $V_4$, respectively. Hence, the current flowing through the auxiliary receiver coils $A_1$, $A_2$, and $A_4$ is zero, thereby preventing power losses. In this scenario, only the auxiliary converter $R_3$ is operational and the voltage $V_b$ obtained at the auxiliary output terminal 506 is equal to the voltage rectified by the auxiliary converter $R_3$. Specifically, in this example, voltage $V_3$ is rectified by auxiliary converter $R_3$ to obtain the voltage $V_b$ at the auxiliary output terminal 506.

In accordance with aspects of the present specification, the activation and deactivation of the diodes of the auxiliary converters $R_1$, $R_2$, $R_3$, and $R_4$ are performed without use of controllers. Specifically, the particular auxiliary converter having the maximum input voltage is activated and the remaining auxiliary converters are deactivated resulting in lower power losses.

Although in the illustrated embodiment, each auxiliary receiver coil is coupled to a corresponding auxiliary converter, in other embodiments, a plurality of auxiliary receiver coils may be coupled to one auxiliary converter. Also, although the example of FIG. 5 depicts use of passive diode rectifiers, use of other types of auxiliary converters and main converters are envisaged. In one embodiment, the auxiliary converters and the main converters may be active rectifiers.

Figure 6:
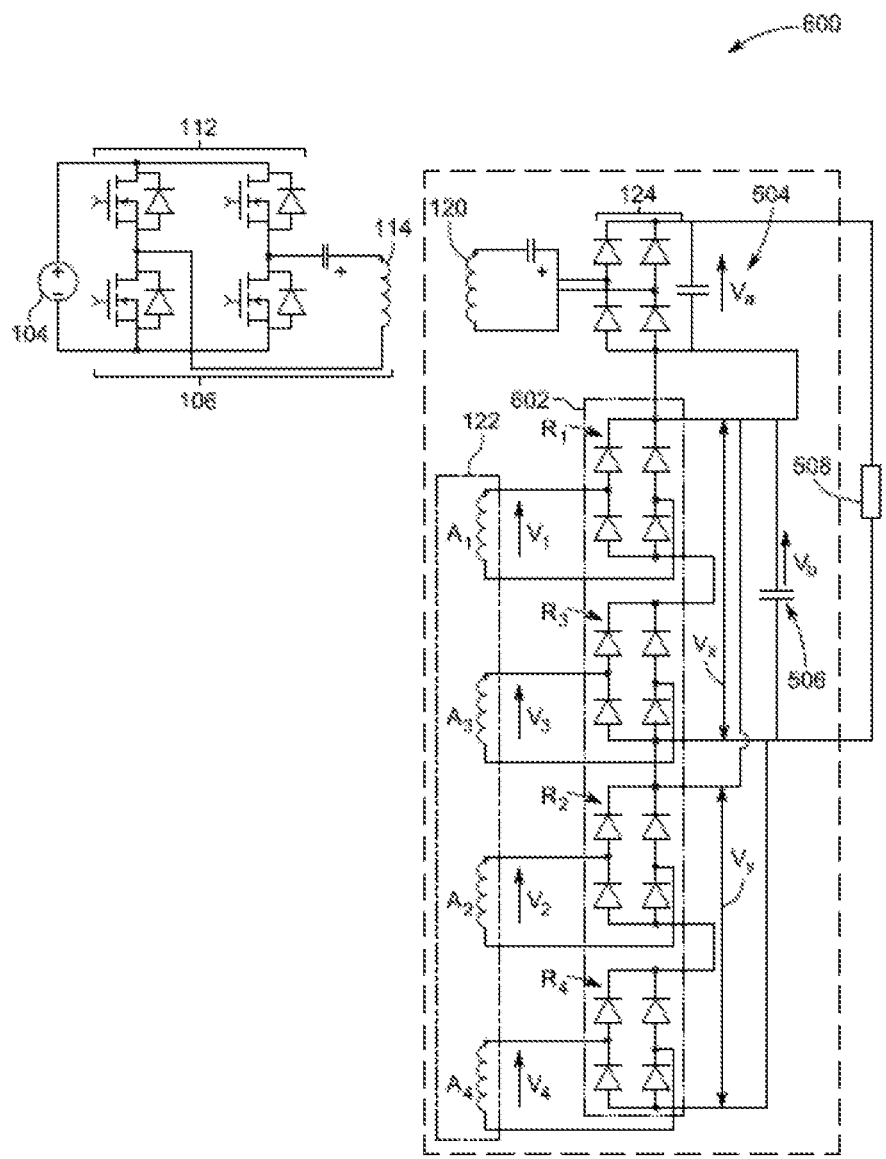
FIG. 6 is a detailed circuit representation of another example wireless power transfer system.

FIG. 6 is a detailed circuit representation of a wireless power transfer system 600 of FIG. 1, in accordance with another embodiment of the present specification. The wireless power transfer system 100 includes the power source 104, the transmitter unit 106, the receiver unit 108, and the load 508. The transmitter unit 106 includes the transmitter drive subunit 112 coupled to the transmitter coil 114. The receiver unit 108 includes the main receiver coil 120, the main converter 124, the plurality of auxiliary receiver coils 122, and the plurality of auxiliary converters 602. The main receiver coil 120 is coupled to the main converter 124. Further, the plurality of auxiliary receiver coils 122 is coupled to the plurality of auxiliary converters 602. The auxiliary converters 602 are represented as $R_1$, $R_2$, $R_3$, and $R_4$. The auxiliary receiver coils 122 are represented as $A_1$, $A_2$, $A_3$, and $A_4$. In the illustrated embodiment, the auxiliary receiver coil $A_1$ is coupled to the auxiliary converter $R_1$, and in a similar manner, the auxiliary receiver coils $A_2$, $A_3$, and $A_4$ are coupled to auxiliary converters $R_2$, $R_3$, and $R_4$, respectively.

Further, the auxiliary converter $R_1$ is coupled in series with auxiliary converter $R_3$. Further, the auxiliary converter $R_2$ is coupled in series with the auxiliary converter $R_4$. Furthermore, a combination of the auxiliary converters $R_1$ and $R_3$ is coupled across the auxiliary converters $R_2$ and $R_4$ in parallel to form an auxiliary output terminal 506. The main converter 124 is coupled in series with the plurality of auxiliary converters 602, such that the main output terminal 504 of the main converter 124 is in series with the auxiliary output terminal 506. Further, the main converter 124 and the plurality of auxiliary converters 602 are coupled across the load 508. Additionally, the main receiver coil 120, the main converter 124, the auxiliary receiver coils 122, and the auxiliary converters 602 are disposed on a single printed circuit board 604.

In the presently contemplated configuration, a voltage $V_{rx}$ is induced across the main receiver coil 120. The voltage $V_{rx}$ is rectified by the main converter 124 and the voltage $V_a$ is obtained at the main output terminal 504. In a similar manner, voltages $V_1$, $V_2$, $V_3$, and $V_4$ are induced across the auxiliary receiver coils $A_1$, $A_2$, $A_3$, and $A_4$. The auxiliary converters $R_1$, $R_3$, and $R_4$ are configured to rectify the voltages $V_1$, $V_2$, $V_3$, and $V_4$, respectively.

Rectified voltages at the outputs of the auxiliary converters $R_1$ and $R_3$ are represented as $V_x$ and rectified voltages at the outputs of the auxiliary converters $R_2$ and $R_4$ are represented as $V_y$. If the voltage $V_x$ is greater than the voltage $V_y$, diodes of the auxiliary converters $R_2$ and $R_4$ are reverse biased. In this scenario, the auxiliary converters $R_2$ and $R_4$ do not rectify the voltages $V_2$ and $V_4$ and only the auxiliary converters $R_1$ and $R_3$ rectify the voltages $V_1$ and $V_3$, respectively. Hence, the current flowing in the auxiliary receiver coils $A_2$ and $A_4$ is zero.

Further, an output voltage $V_b$ is obtained at the auxiliary output terminal 506. In one example, the rectified voltage $V_b$ is equal to the voltage $V_x$. A combination of the voltage $V_a$ at the main output terminal 504 and the voltage $V_b$ at the auxiliary output terminal 506 is provided to the load 508. In one embodiment, a sum of voltages $V_a$ and $V_b$ may be provided to the load 508.

Figure 7:
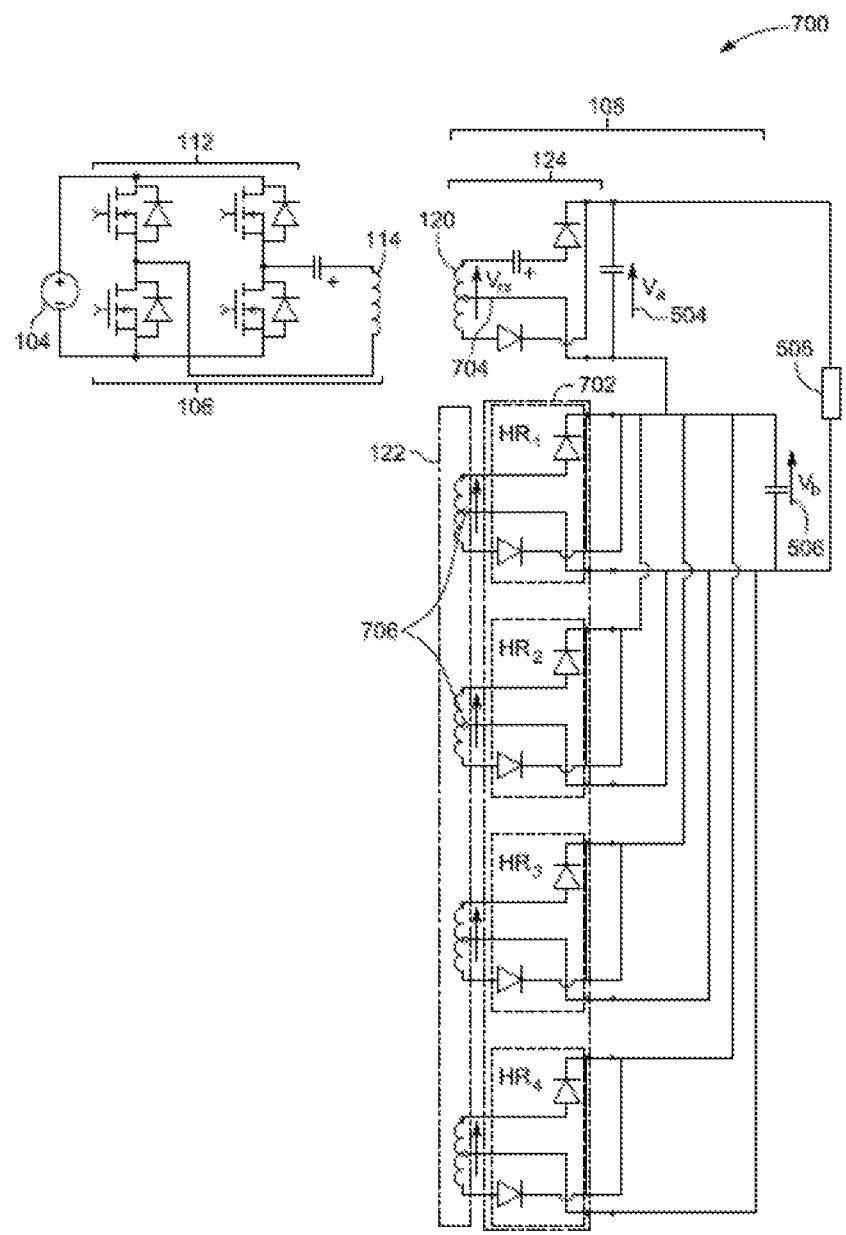
FIG. 7 is a detailed circuit representation of another example wireless power transfer system.

FIG. 7 is a detailed circuit representation of a wireless power transfer system 700 in accordance with yet another embodiment of the present specification. The wireless power transfer system 100 includes the power source 104, the transmitter unit 106, the receiver unit 108, and the load 508. The transmitter unit 106 includes the transmitter drive subunit 112 coupled to the transmitter coil 114. The receiver unit 108 includes the main receiver coil 120, the main converter 124, the plurality of auxiliary receiver coils 122, and the plurality of auxiliary converters 702. The main receiver coil 120 is coupled to the main converter 124. The plurality of auxiliary receiver coils 122 is coupled to the plurality of auxiliary converters 702. For ease of representation, the plurality of auxiliary converters 702 are represented as $HR_1$, $HR_2$, $HR_3$, and $HR_4$.

In the example of FIG. 7, each of the main converter 124 and the plurality of auxiliary converters 702 is a center tapped full-wave diode rectifier. The main converter 124 includes two diodes and a center tap terminal 704 which is a contact at a point of the main receiver coil 120, preferably at the mid-point of the main receiver coil 120. Similarly, each of the plurality of auxiliary converters 702 includes two diodes and a center-tap terminal 706 which is a contact at a point of the corresponding auxiliary receiver coil 122. The two diodes of each of the converters 124 and 702 are connected to the opposite ends of the corresponding coils 120, 122.

In accordance with the illustrated embodiments of FIGS. 5-7, the number of diodes in the plurality of auxiliary converters 702 is half the number of diodes in the plurality of auxiliary converters 502 or 602. Power losses are reduced since the plurality of auxiliary converters 702 have reduced number of diodes.

As noted hereinabove, a voltage is induced across the main receiver coil 120 and the plurality of auxiliary receiver coils 122 based on alignment with the transmitter coil 114. The voltage induced across the main receiver coil 120 is represented as $V_{rx}$. The main converter 124 rectifies the voltage $V_{rx}$ and a voltage $V_a$ is obtained at the main output terminal 504. In a similar manner, the auxiliary converters $HR_1$, $HR_2$, $HR_3$, and $HR_4$ rectify the voltage induced at the auxiliary receiver coils 122. Accordingly, a rectified voltage $V_b$ is generated at the auxiliary output terminal 506. Further, a combination of voltages $V_a$ and $V_b$ is provided to the load 508.

Figure 8:
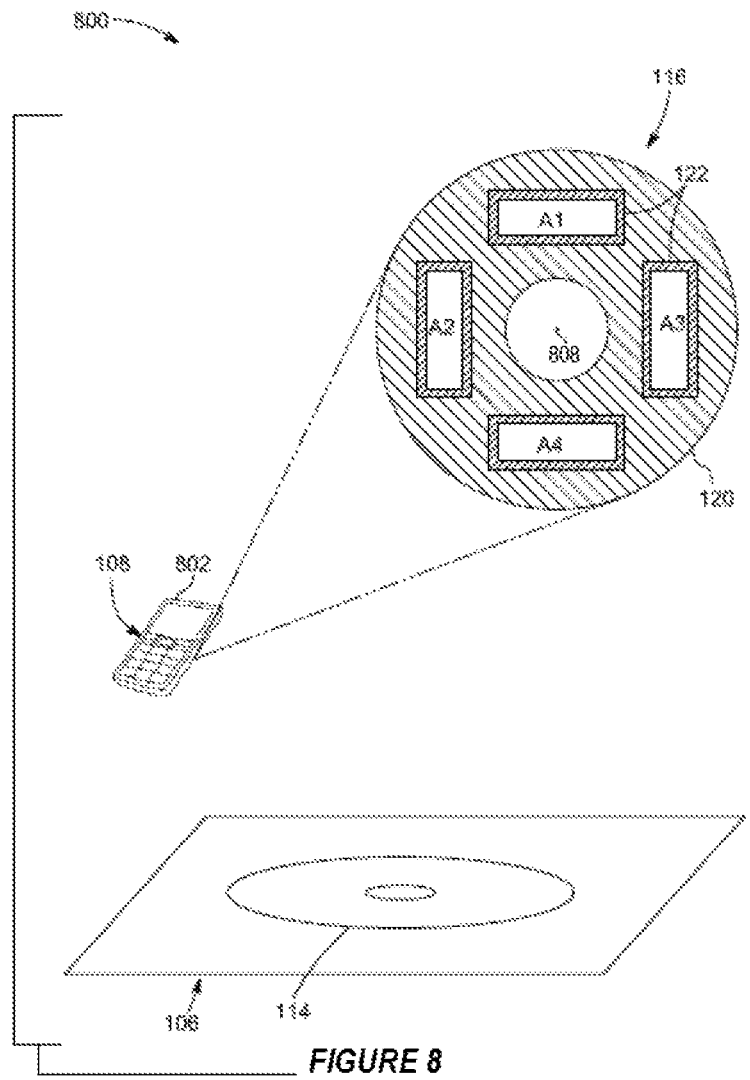
FIG. 8 is a schematic representation of an example wireless power transfer unit for use in a wireless power transfer system.

FIG. 8 is a schematic representation of a wireless power transfer unit 800 in accordance with one embodiment of the present specification. The wireless power transfer unit 800 includes the transmitter unit 106 and the receiver unit 108. In the illustrated embodiment, the transmitter unit 106 has the plurality of transmitter coils 114. The receiver unit 108 is disposed in a mobile phone 802. The receiver unit 108 includes the receiver coil 116 having the main receiver coil 120 and the plurality of auxiliary receiver coils 122. The plurality of auxiliary receiver coils 122 is disposed about the central axis 808 of the main receiver coil 120. Specifically, the plurality of auxiliary receiver coils 122 disposed on the main receiver coil 120. The main receiver coil 120 and the plurality of auxiliary receiver coils 122 are coupled to the load (not shown) via the corresponding converters (not shown). In one embodiment, the load is a battery or a battery charger of the mobile phone 802.

A voltage is induced across the main receiver coil 120 and the plurality of auxiliary receiver coils 122 based on the alignment of the main receiver coil 120 and the plurality of auxiliary receiver coils 122 with respect to the transmitter coil 114. Further, the voltage induced at the receiver coil 116, is rectified and provided to the load. In particular, the voltages at the main receiver coil 120 and the plurality of auxiliary receiver coils 122 are rectified by the main converter (not shown) and the plurality of auxiliary converters (not shown), respectively. Further, the rectified voltages obtained at the main output terminal (not shown) and the auxiliary output terminal (not shown) is provided to the load, such as the battery. Accordingly, the battery of the receiver unit 108 is charged.

FIGS. 9A and 9B are cross-sectional representations 900A, 900B of a portion of a wireless power transfer unit 102 in accordance with aspects of the present specification. In particular, FIGS. 9A and 9B are cross-sectional representations of the transmitter unit 106 and the receiver unit 108 of the wireless power transfer unit 102. More particularly, FIGS. 9A and 9B depict the transmitter coil 114 and the receiver coil 116. The orientation of the wireless power transfer unit 102 is for illustrative purpose and should not be construed as limitation of the embodiment.

In particular, in the embodiment of FIG. 9A, the transmitter coil 114 is disposed on a corresponding ferrite layer 902. Reference numeral 904 is representative of a central axis of the transmitter coil 114. The central axis 904 of the transmitter coil 114 passes through a center of the transmitter coil 114 and is in perpendicular to a x-y plane of the transmitter coil 114. The receiver coil 116 includes the main receiver coil 120 and the auxiliary receiver coils 122. An interface layer 906 is disposed between the receiver coil 116 and the transmitter coil 114. The interface layer 906 may be made of a non-magnetic insulation material, such as Teflon™, any polymer, plastic, ceramic, mylar, and the like.

Further, the main receiver coil 120 is disposed on a corresponding ferrite layer 910. The auxiliary receiver coils 122 are disposed about the central axis 808 on the main receiver coil 120. In the illustrated embodiment, the auxiliary receiver coils 122 are disposed between the main receiver coil 120 and the interface layer 906.

Furthermore, the central axis 904 is aligned with the central axis 808. Accordingly, the main receiver coil 120 is aligned with the transmitter coil 114. When the main receiver coil 120 is aligned with the transmitter coil 114, the main receiver coil 120 has maximum magnetic coupling with the transmitter coil 114 compared to the auxiliary receiver coils 122. Hence, a higher voltage is induced across the main receiver coil 120 compared to a voltage induced across the auxiliary receiver coils 122. Although the embodiment of FIG. 9A represents the transmitter coil 114 aligned with the main receiver coil 120, in another embodiment, the main receiver coil 120 may be misaligned with respect to the transmitter coil 114 and at least one of the auxiliary receiver coils 122 may be aligned with respect to the transmitter coil 114.

Referring now to FIG. 9B, the transmitter coil 114 is disposed on the ferrite layer 902. The auxiliary receiver coils 122 are disposed on a corresponding ferrite layer 910. Further, the main receiver coil 120 is disposed on the auxiliary receiver coils 122 such that the auxiliary receiver coils 122 are sandwiched between the ferrite layer 910 and the main receiver coil 120. The main receiver coil 120 is disposed between the auxiliary receiver coils 122 and the interface layer 906.

In the illustrated embodiment, the central axis 808 of the main receiver coil 120 is misaligned with respect to the central axis 904 of the transmitter coil 114. The misalignment of the central axis 808 with respect to the central axis 904 is represented by reference numeral 908. In this embodiment, the auxiliary receiver coil $A_3$ is aligned with respect to the transmitter coil 114. Accordingly, the auxiliary receiver coil $A_3$ has a maximum magnetic coupling with the transmitter coil 114 compared to the main receiver coil 120 and the auxiliary receiver coil $A_2$ with the transmitter coil 114. Thus, a voltage induced across the auxiliary receiver coil $A_3$ is higher than a voltage induced across the auxiliary receiver coil $A_2$. Further, in this embodiment, a voltage induced across the main receiver coil 120 is lower compared to a voltage induced across the auxiliary receiver coil $A_3$, which is aligned with respect to the transmitter coil 114. However, a combination of a voltage induced at the auxiliary receiver coil $A_3$ and a voltage induced at the main receiver coil 120 is provided to the corresponding converters for rectification and subsequently, to a load (not shown). Thus, a desired voltage is provided to the load irrespective of aligned or misaligned conditions of the main receiver coil 120 with respect to the transmitter coil 114. It may be noted that in this scenario, the current in the transmitter coil 114 does not increase substantially. As a result, transfer of desired power to the load is achieved.

Although the illustrated embodiment of FIG. 9B represents the transmitter coil 114 misaligned with respect to the main receiver coil 120, in another embodiment, the main receiver coil 120 may be aligned with respect to the transmitter coil 114 and the auxiliary receiver coils 122 may be misaligned with respect to the transmitter coil 114.

Figure 10A:
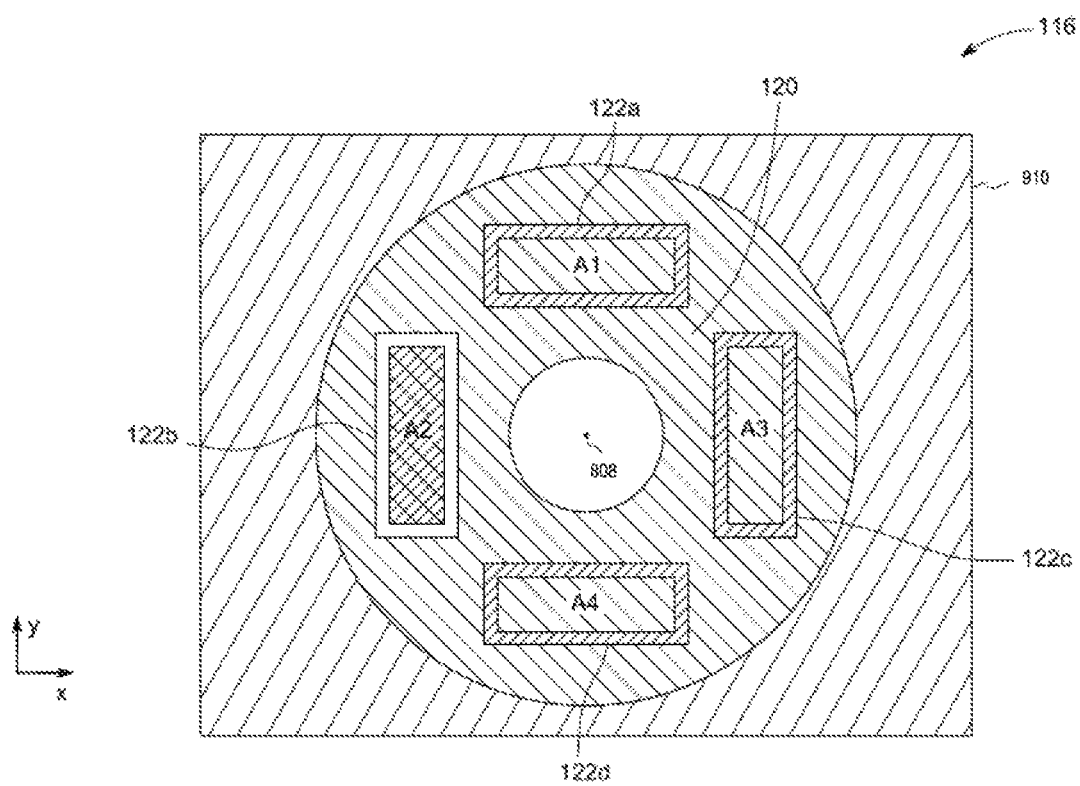
FIG. 10A is a schematic representation of a receiver coil of an example wireless power transfer system.
Figure 10B:
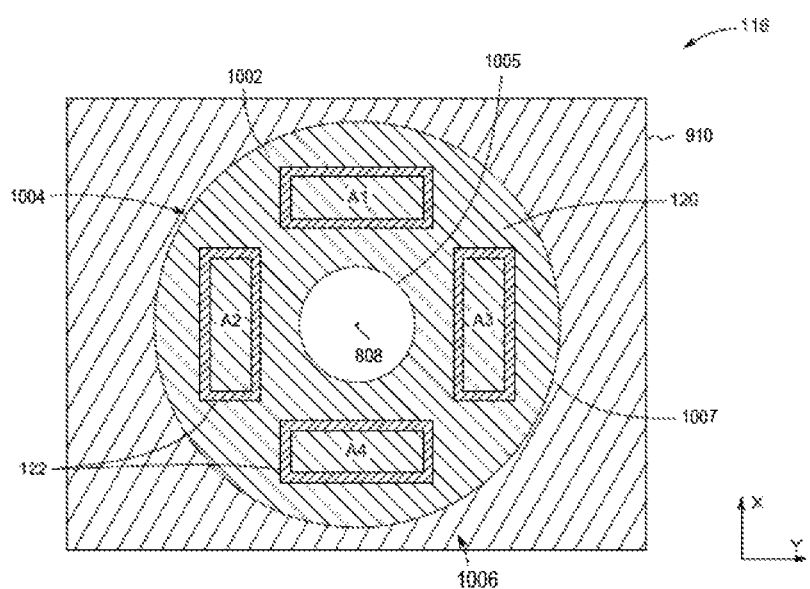
FIG. 10B is another schematic representation showing example receiver coils.

FIG. 10A is a schematic representation of the receiver coil 120 of the wireless power transfer system in accordance with an embodiment of the present specification. In particular, FIG. 10B is a top view of the receiver coil 116. The receiver coil 116 includes the main receiver coil 120 and plurality of auxiliary receiver coils 122a, 122b, 122c, 122d.

Reference numeral 808 is representative of a central axis of the main receiver coil 120. The central axis 808 is referred to as an axis passing through a center and perpendicular to a x-y plane of the main receiver coil 120.

In the illustrated embodiment, the main receiver coil 120 is disposed directly on a ferrite layer 910. According to aspects of the present specification, the plurality of auxiliary receiver coils 122a, 122b, 122c, 122d is disposed about the central axis 808. In the illustrated embodiment, four auxiliary receiver coils 122 are disposed about the main receiver coil 120. The number of auxiliary receiver coils may vary depending on the application.

Referring to FIG. 10B, a schematic representation of a receiver coil 116 in accordance with an embodiment of the present specification is presented. In particular, FIG. 10B is a top view of the receiver coil 116. The receiver coil 116 includes the main receiver coil 120 and the plurality of auxiliary receiver coils 122.

The main receiver coil 120 has a first surface 1002 and a second surface 1004. The first surface 1002 is opposite to the second surface 1004. Further, the main receiver coil 120 has a peripheral side 1006, an inner edge 1005, and an outer edge 1007.

In the illustrated embodiment, the main receiver coil 120 is a flat structure. Specifically, the main receiver coil 120 is square shaped, or rectangular shaped, or oval shaped, or circular shaped, or quadrilateral shaped, or the like. A center portion of the main receiver coil 120 is hollow. The main receiver coil 120 is disposed directly on a ferrite layer 910. Specifically, the second surface 1004 is in direct contact with the ferrite layer 910. In another embodiment, the first surface 1002 may be in direct contact with the ferrite layer 910.

According to aspects of the present specification, the plurality of auxiliary receiver coils 122 is disposed about the central axis 808. In the illustrated embodiment, four auxiliary receiver coils 122 are disposed on the main receiver coil 120. Specifically, the plurality of auxiliary receiver coils 122 is disposed on at least one of the first surface 1002 and the second surface 1004 of the main receiver coil 120. In another embodiment, the auxiliary receiver coils 122 are disposed partially on the main receiver coil 120. In yet another embodiment, the auxiliary receiver coils 122 are disposed proximate to the along the outer edge 1007 proximate to the main receiver coil 120. The number of auxiliary receiver coils 122 may vary depending on the application.

Furthermore, in one embodiment, all the auxiliary receiver coils 122 are equidistant from the central axis 808. In another embodiment, each auxiliary receiver coil of the plurality of auxiliary receiver coils 122 is disposed at a different distance from the central axis 808. In yet another embodiment, the auxiliary receiver coils 122 are symmetrically disposed about the central axis 808. In yet another embodiment, the auxiliary receiver coils 122 are unsymmetrically disposed about the central axis 808. In yet another embodiment, the plurality of auxiliary receiver coils 122 may be arranged concentric to the main receiver coil 120. In yet another embodiment, the auxiliary receiver coils 122 are in a different plane with respect to each other and the main receiver coil 120. In yet another embodiment, one auxiliary receiver coil 122 overlaps another auxiliary receiver coil 122.

The auxiliary receiver coils 122 may be square shaped, rectangular shaped, oval shaped, circular shaped, quadrilateral shaped, or the like. The auxiliary receiver coils 122 are symmetrically shaped or unsymmetrically shaped. In the illustrated embodiment, a center portion of each of the auxiliary receiver coils 122 is hollow.

Although the illustrated embodiment shows only four auxiliary receiver coils 122 disposed on the main receiver coil 120, number of auxiliary and main receiver coils may vary depending on the application. Further, although the illustrated embodiment shows auxiliary receiver coils 122 distributed sparsely about the central axis 808, in one embodiment, the auxiliary receiver coils 122 may be distributed densely about the central axis 808.

In accordance with the embodiments discussed herein, the arrangement of the main receiver coil and the plurality of auxiliary receiver coils aids in enhancing communication with the transmitter coil and allows efficient power transfer between the transmitter coil and the receiver coils even in the event of misalignment of the main receiver coil with the transmitter coil. Further, the arrangement of the auxiliary converters aids in activation and deactivation of the diodes of the auxiliary converters without use of controllers. Furthermore, the wireless power transfer system adjusts misalignments between the transmitter unit and the receiver unit without employing sensors or any other detection techniques, such as camera.

In accordance with the embodiments discussed herein, the arrangement of the main receiver coil, the plurality of auxiliary receiver coils, and the corresponding converters facilitate efficient power transfer between the transmitter coil and the receiver coils even in the event of a misalignment of the main receiver coil with respect to the transmitter coil. Further, the main converter, the auxiliary converters, and other related electronics of the receiver unit are formed on a substrate to form an integrated electronic component. Accordingly, the footprint of the corresponding electronics of the receiver unit is considerably reduced.

FIGS. 1-10B and the operations described herein are examples meant to aid in understanding example implementations and should not be used to limit the potential implementations or limit the scope of the claims. Some implementations may perform additional operations, fewer operations, operations in parallel or in a different order, and some operations differently.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, terms "circuit" and "circuitry" and "controlling unit" may include either a single component or a plurality of components, which are active and/or passive and are connected or otherwise coupled together to provide the described function. In addition, the term operatively coupled as used herein includes wired coupling, wireless coupling, electrical coupling, magnetic coupling, radio communication, software based communication, or combinations thereof.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray' disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

While the disclosure has been described with reference to example embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the scope thereof

What is claimed is:

1. A receiver unit of a wireless power transfer system, the receiver unit comprising:
   a main receiver coil for receiving a wireless power signal having a first voltage from a transmitter unit;

one or more auxiliary receiver coils for receiving the wireless power signal having the first voltage from the transmitter unit; and an integrated electronic component comprising:

a receiver drive subunit comprising:

a main converter operatively coupled to the main receiver coil, wherein the main converter comprises a main output terminal;

one or more auxiliary converters operatively coupled to the one or more auxiliary receiver coils, wherein the one or more auxiliary converters are operatively coupled to each other to form an auxiliary output terminal coupled in series to the main output terminal to form a common output terminal; and a controller configured to determine one or more circuit parameters of the receiver drive subunit, the controller operatively coupled to at least one of the main output terminal, an alternating current terminal of the main converter, the common output terminal, or an alternating current terminal of the common output terminal.

2. The receiver unit of claim 1, wherein one auxiliary converter of the one or more auxiliary converters is operatively coupled in parallel to another auxiliary converter of the one or more auxiliary converters.

3. The receiver unit of claim 1, wherein one auxiliary converter of the one or more auxiliary converters is operatively coupled in series to another auxiliary converter of the one or more auxiliary converters.

4. The receiver unit of claim 1, wherein each of the one or more auxiliary receiver coils is operatively coupled to a corresponding auxiliary converter of the one or more auxiliary converters.

5. The receiver unit of claim 1, wherein at least one of the one or more auxiliary converters is at least one member selected from a group consisting of a passive rectifier, a hybrid rectifier, and an active rectifier.

6. The receiver unit of claim 1, wherein the one or more auxiliary receiver coils is disposed on the main receiver coil.

7. The receiver unit of claim 6, wherein the one or more auxiliary receiver coils is disposed on at least one member selected from a group consisting of a first surface, a second surface, and a peripheral side of the main receiver coil.

8. The receiver unit of claim 1, wherein the one or more auxiliary receiver coils is at least one member selected from a group consisting of a circular shaped, an oval shaped, a square shaped, a triangular shaped, rectangular shaped, asymmetrical shaped, symmetrical shaped, and an elliptical shaped.

9. The receiver unit of claim 1, wherein the one or more auxiliary receiver coils is disposed symmetrically about the central axis of the main receiver coil.

10. The receiver unit of claim 1, wherein at least one of the main receiver coil and the one or more auxiliary receiver coils is disposed on a ferrite layer.

11. The receiver unit of claim 1, wherein the receiver unit is disposed on a printed circuit board.

12. The receiver unit of claim 1, wherein the main receiver coil and the one or more auxiliary receiver coils are resonant coils.

13. The receiver unit of claim 1, wherein the integrated electronic component further comprises:

a communication subunit operatively coupled to the main receiver, the one or more auxiliary receivers, and the controller;

wherein the controller is configured to determine one or more circuit parameters corresponding to at least one of the common output terminal, the alternating current terminal of the main converter, or the alternating current terminals of the plurality of auxiliary converters; and control at least the communication subunit based on the one or more circuit parameters.

14. The receiver unit of claim 13, wherein the communication subunit is coupled to at least one member selected from a group consisting of the alternating current sensor of the main converter, the alternating current sensor of the one or more auxiliary converters, and the common output terminal.

15. The receiver unit of claim 13, wherein the substrate comprises a silicon wafer.

16. The receiver unit of claim 13, wherein the integrated electronic component comprises a plurality of first switches comprising at least one member selected from a group consisting of a diode, an insulated gate bipolar transistor, a metal oxide semiconductor field effect transistor, a field-effect transistor, an injection enhanced gate transistor, an integrated gate commutated thyristor, a gallium nitride based switch, a silicon carbide based switch, and a gallium arsenide based switch.

17. The receiver unit of claim 16, wherein the communication subunit comprises at least one of at least one second switch and a demodulator.

18. The receiver unit of claim 17, wherein the integrated electronic component further comprises a third switch coupled across the common output terminal.

19. The receiver unit of claim 13, wherein the integrated electronic component is an application specific integrated circuit (ASIC), a very large-scale integration (VLSI) chip, a microelectromechanical system (MEMS), or a system on chip (SoC).

20. A wireless power transfer system comprising:

a transmitter unit; and a receiver unit operatively coupled to the transmitter unit, wherein the receiver unit comprises:

a main receiver coil;

a plurality of auxiliary receiver coils;

an integrated electronic component comprising:

a receiver drive subunit comprising:

a main converter operatively coupled to the main receiver coil, wherein the main converter comprises a main output terminal; and a plurality of auxiliary converters operatively coupled to the plurality of auxiliary receiver coils, wherein the plurality of auxiliary converters is operatively coupled to each other to form an auxiliary output terminal coupled in series to the main output terminal to form a common output terminal;

a communication subunit operatively coupled to the receiver drive subunit and a controller operatively coupled to at least one of the common output terminal, an alternating current terminal of the main converter, alternating current terminals of the plurality of auxiliary converters, or the communication subunit, wherein the controller is configured to:

determine one or more circuit parameters corresponding to at least one of the common output terminal, the alternating current terminal of the main converter, or the alternating current terminals of the plurality of auxiliary converters; and control at least a communication subunit based on the one or more circuit parameters.

21. The wireless power transfer system of claim 20, comprising a field focusing coil disposed between the transmitter unit and the receiver unit.

22. The wireless power transfer system of claim 20, comprising a plurality of phase compensation coils configured to compensate a change in at least one of an impedance of the main receiver coil and a phase angle of current flowing through the main receiver coil.

23. The wireless power transfer system of claim 20, wherein the transmitter unit comprises:
a transmitter coil; and
a transmitter drive subunit operatively coupled to the transmitter coil.

24. The wireless power transfer system of claim 23, wherein the plurality of auxiliary receiver coils is configured to compensate a misalignment between the transmitter coil and the main receiver coil.

25. The wireless power transfer system of claim 20, wherein the communication subunit comprises at least one of a plurality of switches or a demodulator.

26. The wireless power transfer system of claim 25, further comprising a plurality of impedance components, wherein a switch of the plurality of switches is coupled to a corresponding impedance component of the plurality of impedance components.

27. The wireless power transfer system of claim 26, wherein the switch of the plurality of switches is operatively coupled to at least one branch of the alternating current terminal of at least one of the main converter or the alternating current terminals of the plurality of auxiliary converters via the corresponding impedance component.

28. The wireless power transfer system of claim 26, wherein the switch of the plurality of switches is coupled to the common output terminal via the corresponding impedance component.

29. The wireless power transfer system of claim 25, wherein one switch of the plurality of switches is coupled to another switch of the plurality of switches.

30. A method of a receiver unit of a wireless power transfer system, comprising:
receiving a wireless power signal having a first voltage from a transmitter unit at a main receiver coil and at least one auxiliary receiver coil based on an alignment of the main receiver coil and the plurality of auxiliary receiver coils with a transmitter coil;
generating a second voltage at a main output terminal of a main converter based on the first voltage;
generating a third voltage at an auxiliary output terminal of a plurality of auxiliary converters based on the first voltage; and
transmitting a combination of the second voltage and the third voltage to a load.

31. A method of operation of a wireless power transfer system, the method comprising:
determining, by a controller, one or more circuit parameters corresponding to at least one of a common output terminal, an alternating current terminal of a main converter, or alternating current terminals of a plurality of auxiliary converters, wherein the common output terminal is formed by connecting an auxiliary output terminal to a main output terminal of the main converter in series, wherein the auxiliary output terminal is formed by operatively coupling the plurality of auxiliary converters of a receiver drive subunit to each other;
controlling operation of a communication subunit based on the one or more circuit parameters, wherein the communication subunit is operatively coupled to the receiver drive subunit;
receiving a wireless power signal having a first voltage from a a transmitter coil of a transmitter unit at a main receiver coil and a plurality of auxiliary receiver coils based on an alignment of the main receiver coil and the plurality of auxiliary receiver coils with the transmitter coil, wherein the plurality of auxiliary converters is operatively coupled to the plurality of auxiliary receiver coils and the main converter is operatively coupled to the main receiver coil; and
generating a second voltage at the common output terminal.

32. The method of claim 31, wherein controlling operation of the communication subunit comprises providing a gate control signal, by the controller, to a plurality of switches of the communication subunit based on the one or more circuit parameters.

33. The method of claim 31, further comprising demodulating information received from the transmitter unit by a demodulator of the communication subunit.

34. An integrated electronic component for a receiver unit of a wireless power transfer system, the integrated electronic component comprising:
a receiver drive subunit, wherein the receiver drive subunit comprises:
a main converter configured to be operatively coupled to a main receiver coil, wherein the main converter comprises a main output terminal; and
a plurality of auxiliary converters configured to be operatively coupled to a plurality of auxiliary receiver coils, wherein the plurality of auxiliary converters is operatively coupled to each other to form an auxiliary output terminal coupled in series to the main output terminal to form a common output terminal;
a communication subunit operatively coupled to the receiver drive subunit; and
a controller operatively coupled to at least one of the receiver drive subunit, and the communication subunit, wherein the controller is configured to:
determine one or more circuit parameters corresponding to the receiver drive subunit; and
control at least the communication subunit based on the one or more circuit parameters.

* * * * *